US008143820B2

(12) United States Patent
Sakuma

(10) Patent No.: US 8,143,820 B2

(45) Date of Patent: Mar. 27, 2012

(54) MOTOR CONTROL DEVICE

(75) Inventor: Yoichi Sakuma, Nagoya (JP)

(73) Assignee: OMRON Corporation, Kyoto (JP)

( * ) Notice: Subject to any disclaimer, the term of this patent is extended or adjusted under 35 U.S.C. 154(b) by 552 days.

(21) Appl. No.: 12/334,206

(22) Filed: Dec. 12, 2008

(65) Prior Publication Data

US 2009/0160374 A1 Jun. 25, 2009

(30) Foreign Application Priority Data

Dec. 21, 2007 (JP) ................................. 2007-330070

(51) Int. Cl.
*H02P 5/00* (2006.01)

(52) U.S. Cl. ........ 318/280; 318/256; 359/874; 359/838; 359/875; 359/873; 359/872; 340/689; 200/6 A

(58) Field of Classification Search .................. 318/280, 318/256; 359/838, 875, 872, 844, 877, 873, 359/874; 340/689; 200/6 A, 61.52, 41.45
See application file for complete search history.

(56) References Cited

U.S. PATENT DOCUMENTS

| | | | | |
|---|---|---|---|---|
| 4,026,048 | A * | 5/1977 | Hill et al. | 37/234 |
| 4,611,102 | A * | 9/1986 | Ishida | 200/5 R |
| 4,687,200 | A * | 8/1987 | Shirai | 463/37 |
| 4,861,950 | A * | 8/1989 | Yanai et al. | 200/5 R |
| 4,866,221 | A * | 9/1989 | Obermann et al. | 200/5 R |
| 4,947,461 | A * | 8/1990 | Yoshioka et al. | 200/5 R |
| 5,034,572 | A * | 7/1991 | Kouno et al. | 200/5 R |
| 5,430,260 | A * | 7/1995 | Koura et al. | 181/144 |
| 5,689,095 | A * | 11/1997 | Kawase | 200/5 R |
| 6,388,210 | B1 * | 5/2002 | Nisse | 200/6 A |
| 6,525,280 | B2 * | 2/2003 | Chan et al. | 200/6 A |
| 7,140,757 | B2 * | 11/2006 | Sakai | 362/494 |
| 7,262,375 | B2 * | 8/2007 | Sakai | 200/5 R |
| 2008/0088960 | A1 * | 4/2008 | Sim | 359/877 |

FOREIGN PATENT DOCUMENTS

| | | | |
|---|---|---|---|
| CN | 2516398 | Y | 10/2002 |
| EP | 1 780 084 | A | 5/2007 |
| JP | 08-212876 | A | 8/1996 |
| JP | 2590446 | Y2 | 12/1998 |
| JP | 2001-351477 | A | 12/2001 |

OTHER PUBLICATIONS

Office Action for Chinese Application No. 200810185670.X mailed on Jun. 1, 2010 and English translation thereof, 21 pages.
English abstract of Chinese Publication No. CN2516398Y published on Oct. 16, 2002, 1 page.
Partial European Search Report for Application No. 08169281, mailed on May 4, 2009 (3 pages).

* cited by examiner

*Primary Examiner* — Rita Leykin
(74) *Attorney, Agent, or Firm* — Osha • Liang LLP

(57) ABSTRACT

A motor control device operable to rotate a motor based on an actuated direction of an operation knob of an operation switch in a direction corresponding to the actuated direction has direction selector switches provided corresponding to respective actuated directions of the operation knob, and open/close elements provided between the direction selector switches and a power supply. Each of the open/close elements is turned on when a control current is supplied thereto. When the operation knob is actuated, the direction selector switch corresponding to the actuated direction is turned on, a control current is supplied from the power supply to the open/close element connected to the relevant switch, and the predetermined open/close element is turned on. A drive current that flows from the power supply into the motor through a current carrying path of the open/close element is controlled according to a ON/OFF status of each of the open/close elements.

10 Claims, 26 Drawing Sheets

Fig. 26

Case where operation knob is actuated normally

| Selector: driver seat (S 1) | Knob actuating direction | | | |
|---|---|---|---|---|
| | Up | Down | Right | Left |
| Action status of RY1 | ON | OFF | ON | OFF |
| Action status of RY2 | OFF | ON | ON | OFF |
| Action status of RY3 | OFF | ON | OFF | ON |
| Motor driving direction | Up | Down | Right | Left |

Fig. 27

Case where operation knob is actuated normally

| Selector: passenger seat (S 2) | Knob actuating direction | | | |
|---|---|---|---|---|
| | Up | Down | Right | Left |
| Action status of RY4 | ON | OFF | ON | OFF |
| Action status of RY5 | OFF | ON | ON | OFF |
| Action status of RY6 | OFF | ON | OFF | ON |
| Motor driving direction | Up | Down | Right | Left |

Fig. 28

Case where operation knob is actuated obliquely

| Selector: driver seat (S 1) | Knob actuating direction | | | |
|---|---|---|---|---|
| | Upper left | Lower left | Lower right | Upper right |
| Action status of RY1 | ON | OFF | ON | ON |
| Action status of RY2 | OFF | ON | ON | ON |
| Action status of RY3 | ON | ON | ON | OFF |
| Motor driving direction | Upper left | Down | Stop | Right |

Fig. 29

Case where operation knob is actuated obliquely

| Selector: passenger seat (S2) | Knob actuating direction | | | |
|---|---|---|---|---|
| | Upper left | Lower left | Lower right | Upper right |
| Action status of RY4 | ON | OFF | ON | ON |
| Action status of RY5 | OFF | ON | ON | ON |
| Action status of RY6 | ON | ON | ON | OFF |
| Motor driving direction | Upper left | Down | Stop | Right |

Fig. 30

Case where operation knob is actuated in all directions

| Selector: driver seat (S 1) | Knob actuating direction |
| --- | --- |
| | Concurrent push in all directions |
| Action status of RY1 | ON |
| Action status of RY2 | ON |
| Action status of RY3 | ON |
| Motor driving direction | Stop |

Fig. 31

Case where operation knob is actuated in all directions

| Selector: passenger seat (S 2) | Knob actuating direction |
| --- | --- |
| | Concurrent push in all directions |
| Action status of RY1 | ON |
| Action status of RY2 | ON |
| Action status of RY3 | ON |
| Motor driving direction | Stop |

MOTOR CONTROL DEVICE

BACKGROUND OF THE INVENTION

1. Technical Field

The present invention relates to a motor control device that controls a rotation direction of a motor through actuation of a switch.

2. Related Art

In order to adjust orientations of mirror sides of outer mirrors which are provided on left and right doors of an automobile, respectively, in a vertical direction and/or a horizontal direction, for example, there has been used an electrically-driven and remote-controlled switch including an operation knob capable of tilting in four directions. Japanese Unexamined Patent Publication No. 2001-351477 and Japanese Utility Model Registration No. 2590446 disclose switches of this type, respectively.

In Japanese Unexamined Patent Publication No. 2001-351477, an operation knob has a protrusion formed at a center of a back side thereof and a switch body includes a normally-closed shutoff switch provided at a portion corresponding to the protrusion. In a case where a user actuates the operation knob in all directions concurrently (concurrent actuation), the protrusion formed on the back side of the operation knob presses the shutoff switch to prevent a dead short in such a manner that the shutoff switch interrupts an electric current between circuits on a wiring board (see FIG. 3). As a conventional technique of preventing such a dead short in the case of occurrence of the concurrent actuation, moreover, Japanese Unexamined Patent Publication No. 2001-351477 discloses the following structure. That is, in order to restrict an actuation amount the operation knob, a protruding portion is provided at center of the switch body or a movable restricting member is movably supported between the switch body and the operation knob in a horizontal direction (see FIGS. 6 and 7).

In Japanese Utility Model Registration No. 2590446, on the other hand, a malfunction that if a user actuates an operation knob obliquely (oblique actuation), a mirror is turned or is not turned depending on a direction in which the operation knob is actuated is avoided in such a manner that two switch elements are disposed at each of four corners of the operation knob, that is, eight switch elements are provided in total. In a case where the user actuates the operation knob, only when four of the eight switch elements, which are disposed at two sides of a pushed operating part, are closed simultaneously, a switching operation is performed normally.

In Japanese Unexamined Patent Publication No. 2001-351477, the dead short of the circuit, which occurs due to the concurrent actuation, is prevented in view of a mechanism of the switch. Consequently, the switch is complicated in structure and is large in size as a whole. In Japanese Utility Model Registration No. 2590446, moreover, the malfunction due to the oblique actuation of the operation knob can be avoided by the change in arrangement of the switch elements and the change in electric circuit. In the electric circuit, however, no countermeasures are taken against a malfunction due to the concurrent actuation. In order to prevent the malfunction due to the concurrent actuation, a microcomputer may be provided to stop an electric motor upon reception of a signal indicating the concurrent actuation from the switch. However, the provision of the microcomputer has high components cost.

SUMMARY

In one or more embodiments of the present invention, a motor control device having a simple and inexpensive configuration capable of dealing with a concurrent actuation and an oblique actuation of an operation knob.

In accordance with one aspect of the present invention, a motor control device rotates a motor, based on a fact that an operation knob of an operation switch is actuated in a predetermined direction, in a direction corresponding to the actuated direction. The motor control device includes a plurality of direction selector switches provided so as to correspond to actuated directions of the operation knob, respectively, and a plurality of open/close elements provided between the relevant direction selector switches and a power supply and turned on when a control current is supplied thereto. Herein, when the operation knob is actuated, the direction selector switch corresponding to the actuated direction is turned on, a control current is supplied from the power supply to a predetermined one of the open/close elements each connected to the relevant switch, and the predetermined open/close element is turned on. Further, a drive current, which flows from the power supply into the motor through a current carrying path of the open/close element, is controlled in accordance with the ON/OFF status of each open/close element.

With this configuration, a predetermined direction selector switch and a predetermined open/close element are turned on in accordance with a direction in which the operation knob is actuated, and a motor drive current is controlled in accordance with an ON/OFF status of each open/close element. Therefore, in any of a case where the operation knob is actuated normally, a case where the operation knob is actuated obliquely, and a case where the operation knob is actuated in all directions concurrently, the motor can be controlled in accordance with a relevant direction in which the operation knob is actuated. Moreover, this motor control device can deal with the case where the operation knob is actuated obliquely and the case where the operation knob is actuated in all the directions concurrently by means of the electric circuit without depending on the structure of the switch, which prevents increase in size of the switch and requires no expensive components such as a microcomputer. Therefore, the motor control device can be realized at low cost.

In one or more embodiments of the present invention, preferably, when the operation knob is actuated in an optional direction, the direction selector switch corresponding to the actuated direction is turned on, and a drive current corresponding to the actuated direction is supplied to the motor.

With this configuration, in the case where the operation knob is actuated normally, a drive current flows into the motor in accordance with a direction in which the operation knob is actuated. Therefore, the motor can be rotated in an intended direction.

In one or more embodiments of the present invention, preferably, when the operation knob is actuated in a plurality of directions other than all directions, the direction selector switches corresponding to the respective actuated directions are turned on, and a drive current is supplied to the motor in a predetermined direction or the supply of the drive current is stopped.

With this configuration, even in the case where the operation knob is actuated obliquely, a drive current is supplied to the motor in a predetermined direction or the supply of the drive current is stopped. Therefore, the motor control device allows prevention of occurrence of a dead short due to a factor that a plurality of direction selector switches are turned on, and allows avoidance of smoking and igniting.

In one or more embodiments of the present invention, preferably, when the operation knob is actuated in all directions, all the direction selector switches are turned on, and the supply of a drive current to the motor is stopped.

With this configuration, even in the case where the operation knob is actuated in all the directions concurrently, supply of a drive current to the motor is stopped. Therefore, the motor control device allows prevention of occurrence of a dead short due to a factor that all the direction selector switches are turned on, and allows avoidance of smoking and igniting.

In one or more embodiments of the present invention, preferably, the operation switch serves as a mirror switch for adjusting an orientation of a mirror provided on a vehicle. In this case, the operation knob is actuated in four directions in order to allow the mirror to tilt in one of an up direction, a down direction, a right direction and a left direction. When the operation knob is actuated in one direction among the four directions, that is, when the operation knob is actuated normally, one direction selector switch corresponding to the actuated direction is turned on, and a drive current corresponding to the actuated direction is supplied to the motor. Moreover, when the operation knob is actuated in two directions among the four directions, that is, when the operation knob is actuated obliquely two direction selector switches corresponding to the actuated directions are turned on, and a drive current is supplied to the motor in a predetermined direction or the supply of the drive current is stopped. Further, when the operation knob is actuated in the four directions, that is, when the operation knob is actuated in all the directions, four direction selector switches are turned on, and the supply of a drive current to the motor is stopped.

With this configuration, in the case where the operation knob is actuated normally, a drive current flows into the motor in accordance with a direction in which the operation knob is actuated. Therefore, the mirror can tilt in an intended direction. Moreover, even in the case where the operation knob is actuated obliquely or is actuated in all the directions concurrently, a drive current is supplied to the motor in a predetermined direction or the supply of the drive current to the motor is stopped. Therefore, the motor control device allows prevention of occurrence of a dead short due to a factor that a plurality of direction selector switches are turned on, and allows avoidance of smoking and igniting.

In one or more embodiments of the present invention, preferably, the mirror switch includes a selector knob for selecting a control target from a mirror provided on a driver seat side of a vehicle and a mirror provided on a passenger seat side of the vehicle. In this case, a switch contact, which is turned on when the driver seat-side mirror is selected by the selector knob, is inserted between each open/close element for controlling the driver seat-side mirror and the power supply. Moreover, a switch contact, which is turned on when the passenger seat-side mirror is selected by the selector knob, is inserted between each open/close element for controlling the passenger seat-side mirror and the power supply.

With this configuration, the selector knob is switched to control tilting directions of the plurality of mirrors independently of each other. Moreover, in the case where the operation knob is actuated normally, each mirror can tilt in an intended direction. On the other hand, in the case where the actuation knob is actuated obliquely or is actuated in all the directions concurrently, each mirror can tilt in a predetermined direction or the tilt of each mirror can be stopped.

In one or more embodiments of the present invention, preferably, the open/close element serves as a relay. In this case, when the relay is turned off, a contact of the relay is switched to a ground side to disconnect the motor from the power supply. Moreover, when the relay is turned on, the contact of the relay is switched to a power supply side to connect the motor to the power supply.

With this configuration, a control circuit can be configured with a simple circuit using the relay. Further, use of such an inexpensive relay allows suppression of increase of cost as the entire device.

According to one or more embodiments of the present invention, the motor control device can deal with the case where the operation knob is actuated obliquely and the case where the operation knob is actuated in all the directions concurrently by means of the electric circuit without depending on the structure of the switch, which prevents increase in size of the switch and requires no expensive components such as a microcomputer. Therefore, the motor control device can be realized at low cost.

BRIEF DESCRIPTION OF THE DRAWINGS

FIG. 26 shows a table of the actions for controlling the driver seat-side mirror in the case where the operation knob is actuated normally;

FIG. 27 shows a table of the actions for controlling the passenger seat-side mirror in the case where the operation knob is actuated normally;

FIG. 28 shows a table of the actions for controlling the driver seat-side mirror in the case where the operation knob is actuated obliquely;

FIG. 29 shows a table of the actions for controlling the passenger seat-side mirror in the case where the operation knob is actuated obliquely;

FIG. 30 shows a table of the actions for controlling the driver seat-side mirror in the case where the operation knob is actuated in all the directions concurrently; and FIG. 31 shows a table of the actions for controlling the passenger seat-side mirror in the case where the operation knob is actuated in all the directions concurrently.

DETAILED DESCRIPTION

Hereinafter, preferred embodiments of the present invention will be described with reference to the drawings. Herein, description will be given of a case where the present invention is applied to a mirror adjustment device that adjusts an orientation of a mirror in a vehicle such as an automobile.

Figure 1:
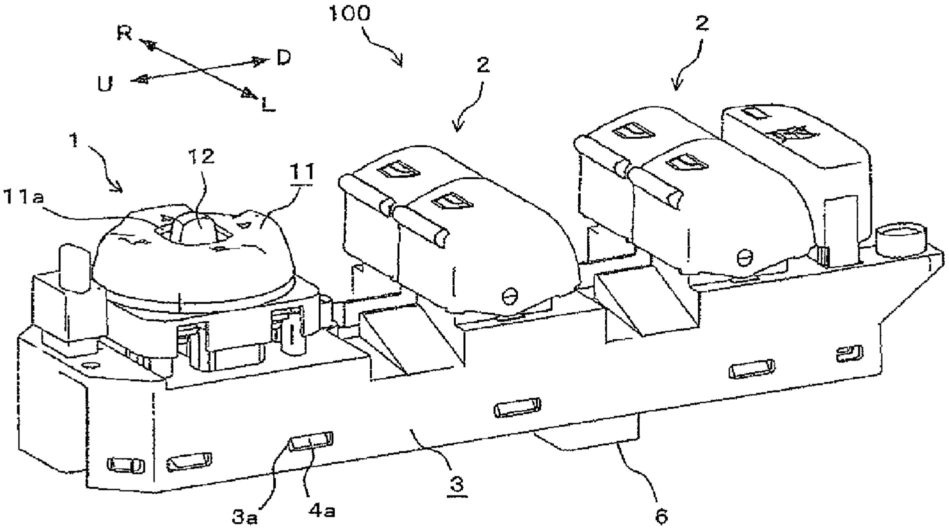
FIG. 1 is a perspective view showing one example of a switch device for use in one or more embodiments of the present invention.
Figure 2:
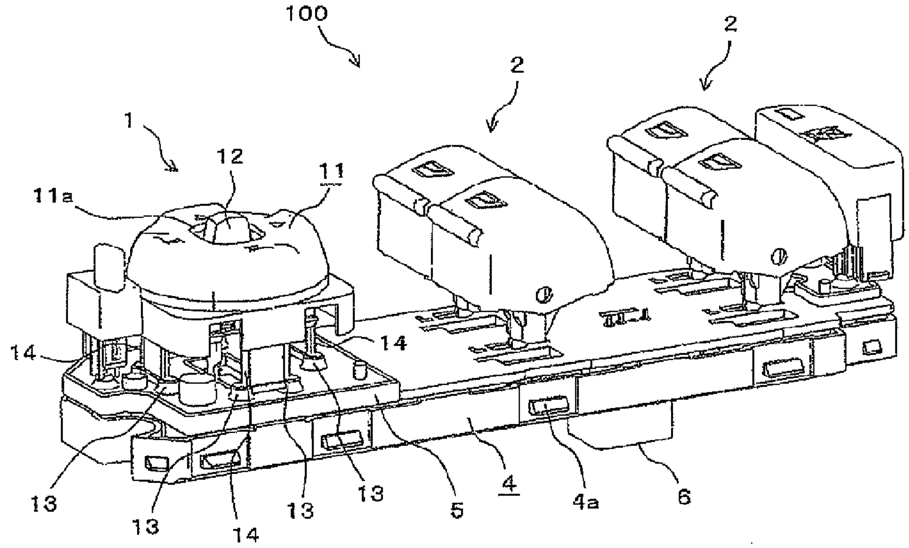
FIG. 2 is a perspective view showing a state that a housing is removed from the switch device.

FIGS. 1 and 2 are perspective views each showing one example of a switch device for use in one or more embodiments of the present invention. Specifically, FIG. 1 shows a state that a housing is attached to the switch device and FIG. 2 shows a state that the housing is removed from the switch device. As shown in FIGS. 1 and 2, the switch device 100, which is provided on a driver seat or the like of a vehicle, includes a mirror switch 1 for controlling a mirror and a window switch 2 for opening/closing a window. These switches 1 and 2 are bared upward from the housing 3 as shown in FIG. 1 and are mounted on a base 4 as shown in FIG. 2. The base 4 has a protrusion 4*a* formed at a side face thereof. When the protrusion 4*a* is fit into an opening 3*a* of the housing 3, the housing 3 is secured to the base 4. The switch device 100 also includes a base board 5 on which a contact part 13 (to be described later) is mounted, and a connector part 6 to which a connector (not shown) is connected. Herein, the switch device 100 further includes switches other than the mirror switch 1 and the window switch 2. However, such switches are not directly pertinent to the present invention; therefore, description thereof will not be given here. Moreover, the switch device 100 also includes a cover having holes from which operating parts for the respective switches are bared; however, the cover is not shown in FIGS. 1 and 2.

The mirror switch 1 includes an operation knob 11 capable of tiling in four directions (i.e., an up direction U, a down direction D, a left direction L and a right direction R in FIG. 1), and a selector knob 12 capable of sliding in the left direction L and the right direction R. The operation knob 11 has a through hole 11*a* formed at a center thereof, and the selector knob 12 is inserted through the through hole 11*a*. As shown in FIG. 2, the operation knob 11 has operating pieces 14 formed at portions corresponding to the four directions, respectively. The contact parts 13 are mounted on the base board 5 at positions corresponding to the respective operating pieces 14. Moreover, the selector knob 12 is coupled to a contact part (not shown). The mirror switch 1 is one example of an operation switch according to one or more embodiments of the present invention.

Figure 3:
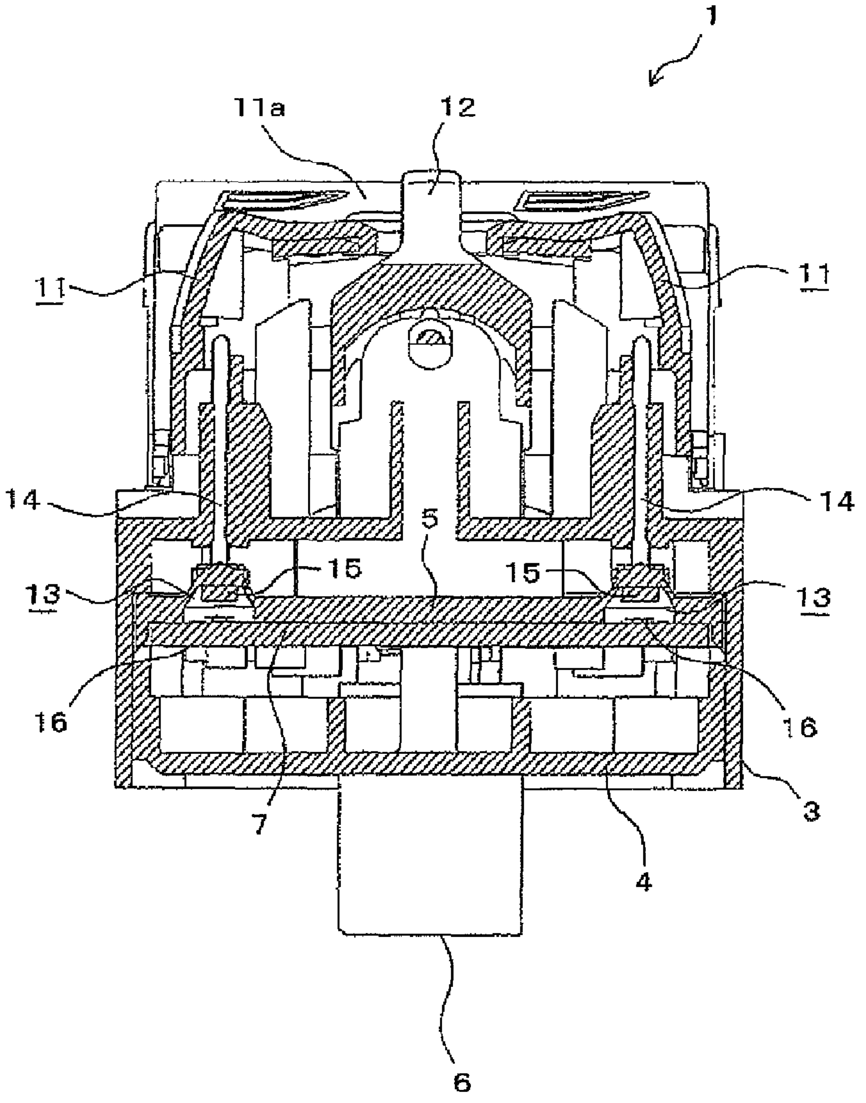
FIG. 3 is a sectional view showing the switch device.

FIG. 3 is a sectional view showing the contact part 13 of the mirror switch 1. As shown in FIG. 3, the contact part 13 includes a movable contact 15 and a fixed contact 16. Herein, the movable contact 15 is made of rubber. When a user actuates the operation knob 11, the operating piece 14 moves downward to press the movable contact 15. Then, the movable contact 15 is displaced downward to come into contact with the fixed contact 16. The fixed contact 16 is in a form of a copper foil which is formed on a printed circuit board 7 attached to a back side of the base board 5.

Figure 4:
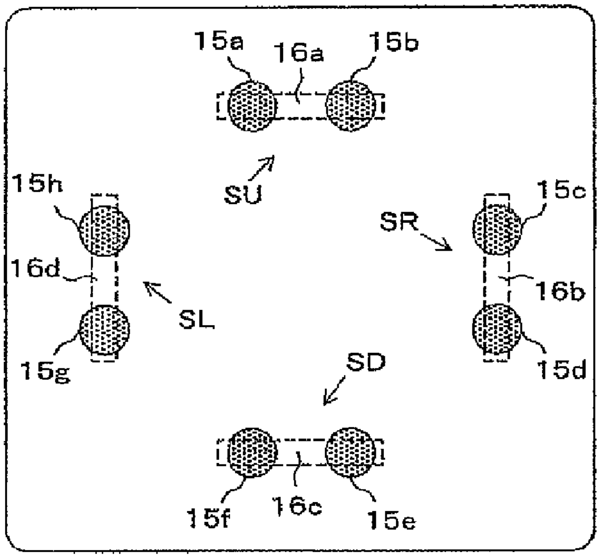
FIG. 4 is a schematic view showing an action of a contact in the switch device.

As shown in FIG. 4, the movable contact 15 consists of eight movable contacts 15*a* to 15*h*. Herein, the movable contacts 15*a* and 15*b*, the movable contacts 15*c* and 15*d*, the movable contacts 15*e* and 15*f* and the movable contacts 15*g* and 15*h* are disposed at portions corresponding to the actuating directions (the four directions U, R, D, L in FIG. 1) of the operation knob 11, respectively. On the other hand, the fixed contact 16 consists of four fixed contacts 16*a* to 16*d*. Herein, the fixed contact 16*a*, the fixed contact 16*b*, the fixed contact 16*c*, and the fixed contact 16*d* are disposed for the movable contacts 15*a* and 15*b*, the movable contacts 15*c* and 15*d*, the movable contact 15*e* and 15*f*, and the movable contact 15*g* and 15*h*, respectively.

The movable contacts 15*a* and 15*b* and the fixed contact 16*a* constitute an up-direction switch SU. The movable contacts 15*c* and 15*d* and the fixed contact 16*b* constitute a right-direction switch SR. The movable contacts 15*e* and 15*f* and the fixed contact 16*c* constitute a down-direction switch SD. The movable contacts 15*g* and 15*h* and the fixed contact 16*d* constitute a left-direction switch SL. Each of the switches SU, SR, SD and SL is one example of a direction selector switch according to one or more embodiments of the present invention.

Figure 5:
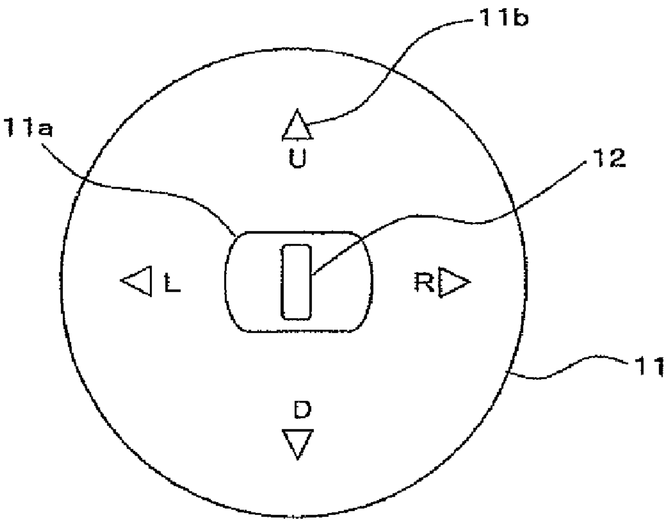
FIG. 5 is a plan view showing an operation knob.

FIG. 5 is a plan view showing the operation knob 11. The operation knob 11 is provided with marks 11*b* indicating the actuating directions U (Up), D (Down), R (Right) and L (Left), respectively. When the selector knob 12 is switched rightward from a neutral position in FIG. 5, a mirror provided on a driver seat side becomes a control target. On the other hand, when the selector knob 12 is switched leftward from the neutral position, a mirror provided on a passenger seat side becomes a control target. When the user pushes a portion corresponding to the mark 11*b* (U) in the operation knob 11, the movable contacts 15*a* and 15*b* come into contact with the fixed contact 16*a* as shown in FIG. 4 and the up-direction switch SU is closed, so that the mirror tilts upward. When the user pushes a portion corresponding to the mark 11*b* (R) in the operation knob 11, the movable contacts 15*c* and 15*d* come into contact with the fixed contact 16*b* as shown in FIG. 4 and the right-direction switch SR is closed, so that the mirror tilts rightward. When the user pushes a portion corresponding to the mark 11*b* (D) in the operation knob 11, the movable contacts 15*e* and 15*f* come into contact with the fixed contact 16*c* as shown in FIG. 4 and the down-direction switch SD is closed, so that the mirror tilts downward. When the user pushes a portion corresponding to the mark 11*b* (L) in the operation knob 11, the movable contacts 15*g* and 15*h* come into contact with the fixed contact 16*d* as shown in FIG. 4 and the left-direction switch SL is closed, so that the mirror tilts leftward.

Figure 6:
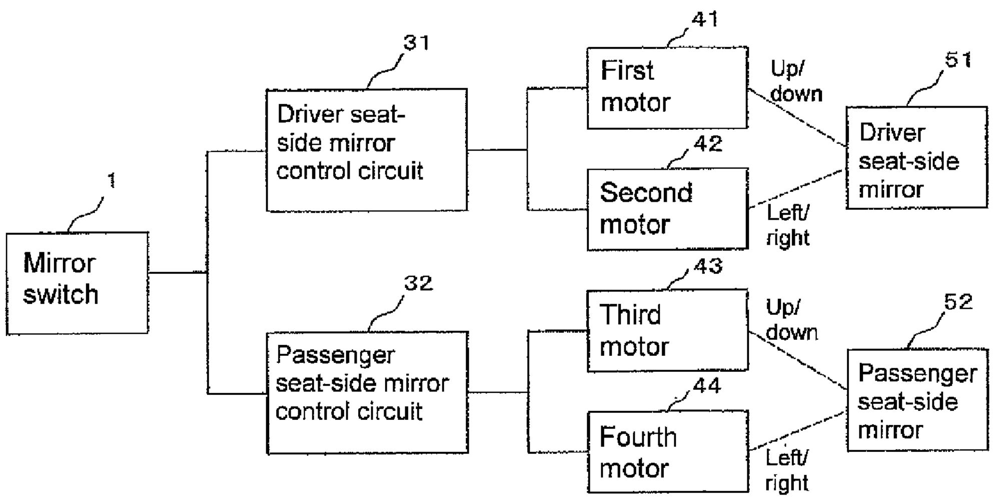
FIG. 6 is a block diagram showing a mirror adjustment device according to one embodiment of the present invention.

FIG. 6 is a block diagram showing a mirror adjustment device according to one embodiment of the present invention. As shown in FIG. 6, the mirror adjustment device includes the mirror switch 1 described above, a driver seat-side mirror control circuit 31 for controlling the mirror on the driver seat side, a passenger seat-side mirror control circuit 32 for controlling the mirror on the passenger seat side, a first motor 41 for vertical adjustment which is driven by the driver seat-side mirror control circuit 31, a second motor 42 for horizontal adjustment which is driven by the driver seat-side mirror control circuit 31, a third motor 43 for vertical adjustment which is driven by the passenger seat-side mirror control circuit 32, a fourth motor 44 for horizontal adjustment which is driven by the passenger seat-side mirror control circuit 32, the driver seat-side mirror 51 of which a tilting direction is adjusted by the first motor 41 and the second motor 42 in a vertical direction and a horizontal direction, and the passenger seat-side mirror 52 of which a tilting direction is adjusted by the third motor 43 and the fourth motor 44 in the vertical direction and the horizontal direction.

Figure 7:
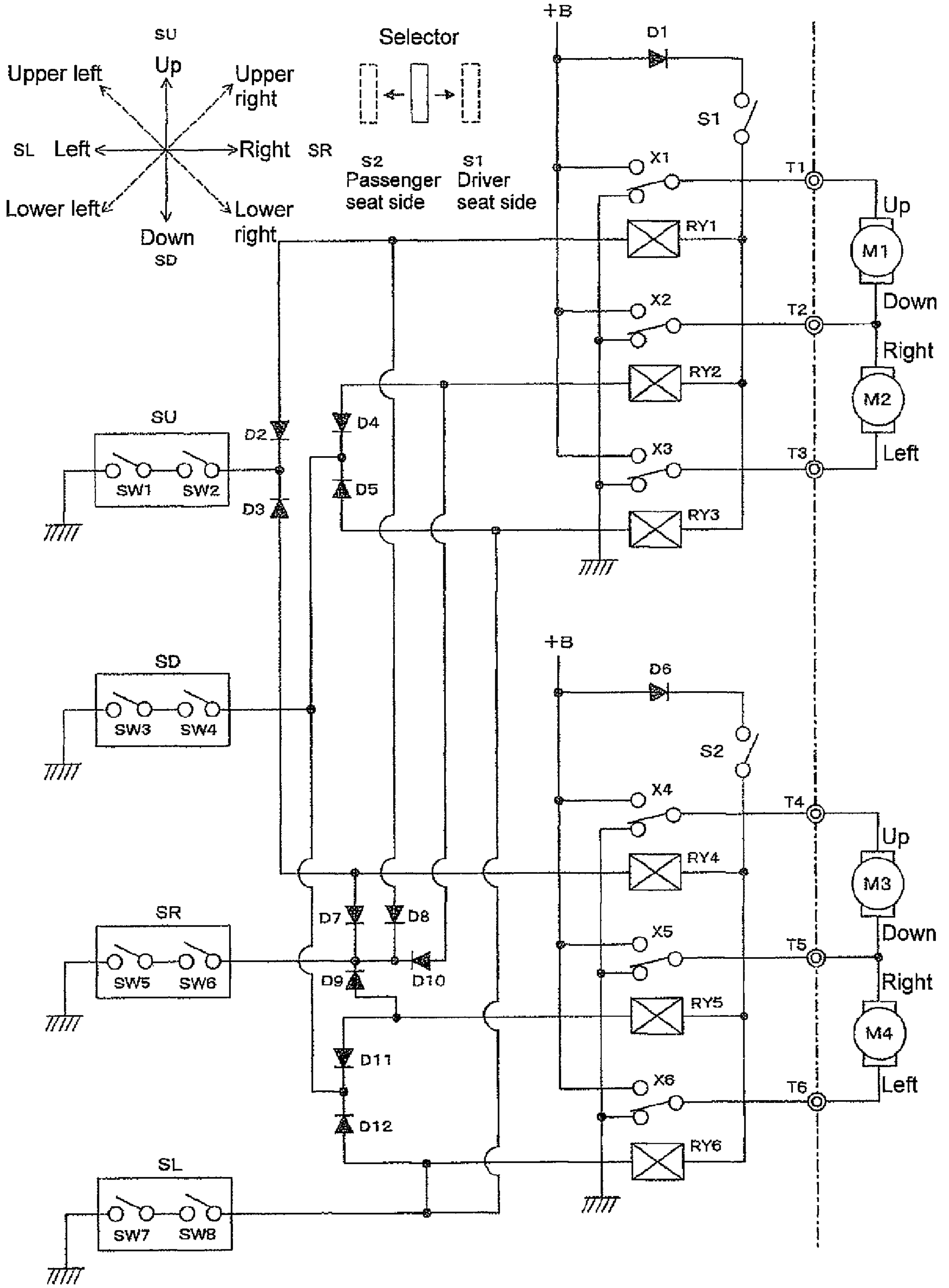
FIG. 7 shows a specific example of circuitry of the mirror adjustment device.

FIG. 7 shows a specific example of circuitry of the mirror adjustment device described above. As shown in FIG. 7, the up-direction switch SU includes a switch contact SW1 configured with the movable contact 15*a* and the fixed contact 16*a* each shown in FIG. 4, and a switch contact SW2 configured with the movable contact 15*b* and the fixed contact 16*a* each shown in FIG. 4. The down-direction switch SD includes a switch contact SW3 configured with the movable contact 15*e* and the fixed contact 16*c* each shown in FIG. 4, and a switch contact SW4 configured with the movable contact 15*f* and the fixed contact 16*c* each shown in FIG. 4. The right-direction switch SR includes a switch contact SW5 configured with the movable contact 15*c* and the fixed contact 16*b* each shown in FIG. 4, and a switch contact SW6 configured with the movable contact 15*d* and the fixed contact 16*b* each shown in FIG. 4. The left-direction switch SL includes a switch contact SW7 configured with the movable contact 15*g* and the fixed contact 16*d* each shown in FIG. 4, and a switch contact SW8 configured with the movable contact 15*h* and the fixed contact 16*d*.

In FIG. 7, a switch contact S1 is turned on when the selector knob 12 is switched rightward in FIG. 5, and is configured with a first movable contact, which is opened/closed in association with the actuation of the selector knob 12, and a first fixed contact. Herein, the first movable contact and the first fixed contact are not shown in FIG. 7. A switch contact S2 is turned on when the selector knob 12 is switched leftward in FIG. 5, and is configured with a second movable contact, which is opened/closed in association with the actuation of the selector knob 12, and a second fixed contact. Herein, the second movable contact and the second fixed contact are not shown in FIG. 7. In the following, each of the switch contacts S1 and S2 is referred to as a "selector".

Also in FIG. 7, relays RY1 to RY3 are provided for controlling the mirror on the driver seat side, respectively, and contacts X1 to X3 are provided for the relays RY1 to RY3, respectively. A motor M1 is provided for adjusting the vertical orientation of the mirror, and equates to the first motor 41 shown in FIG. 6. A motor M2 is provided for adjusting the horizontal orientation of the mirror, and equates to the second mirror 42 shown in FIG. 6. Terminals T1 to T3 are connected with the motors M1 and M2, respectively. Herein, each of the relays RY1 to RY3 is one example of an open/close element according to one or more embodiments of the present invention. Moreover, each of the contacts X1 to X3 for the respective relays RY1 to RY3 is one example of a current carrying path for the open/close element according to one or more embodiments of the present invention.

Also in FIG. 7, relays RY4 to RY6 are provided for controlling the mirror on the passenger seat side, respectively, and contacts X4 to X6 are provided for the relays RY4 to RY6, respectively. A motor M3 is provided for adjusting the vertical orientation of the mirror, and equates to the third motor 43 shown in FIG. 6. A motor M4 is provided for adjusting the horizontal orientation of the mirror, and equates to the fourth mirror 44 shown in FIG. 6. Terminals T4 to T6 are connected with the motors M3 and M4, respectively. Herein, each of the relays RY4 to RY6 is one example of the open/close element according to one or more embodiments of the present invention. Moreover, each of the contacts X4 to X6 for the respective relays RY4 to RY6 is one example of the current carrying path for the open/close element according to one or more embodiments of the present invention.

The up-direction switch SU has a first side which is connected to the relay RY1 through a diode D2 and is also connected to the relay RY4 through a diode D3, and a second side which is connected to a ground. The down-direction switch SD has a first side which is connected to the relays RY2 and RY3 through diodes D4 and D5 and is also connected to the relays RY5 and RY6 through diodes D11 and D12, and a second side which is connected to the ground. The right-direction switch SR has a first side which is connected to the relays RY1 and RY2 through diodes D8 and D10 and is also connected to the relays RY4 and RY5 through diodes D7 and D9, and a second end which is connected to the ground. The left-direction switch SL has a first side which is connected to the relays RY3 and RY6, and a second side which is connected to the ground.

Each of the relays RY1 to RY3 is connected to a power supply +B through the selector S1 and the diode D1. The contacts X1 to X3 for the relays RY1 to RY3 are provided between the power supply +B and the terminals T1 to T3, respectively. Normally, the contacts X1 to X3 are switched to the ground side. When the relays RY1 to RY3 are activated, the contacts X1 to X3 are switched to the power supply side, so that a voltage is applied to each of the motors M1 and M2 through the terminals T1 to T3.

Each of the relays RY4 to RY6 is connected to the power supply +B through the selector S2 and the diode D6. The contacts X4 to X6 for the relays RY4 to RY6 are provided between the power supply +B and the terminals T4 to T6, respectively. Normally, the contacts X4 to X6 are switched to the ground side. When the relays RY4 to RY6 are activated, the contacts X4 to X6 are switched to the power supply side, so that a voltage is applied to each of the motors M3 and M4 through the terminals T4 to T6.

Next, description will be given of actions in the circuitry shown in FIG. 7 in a case where the operation knob 11 is actuated normally, actions in the circuitry shown in FIG. 7 in a case where a case where the operation knob 11 is actuated obliquely, and actions in the circuitry shown in FIG. 7 in a case where the operation knob 11 is actuated in all directions concurrently.

(1) Case Where Operation Knob is Actuated Normally

With reference to FIGS. 8 to 11, first, description will be given of actions at the time when the operation knob 11 is actuated normally in a case where the selector knob 12 is switched to the driver seat side (the right side).

Figure 8:
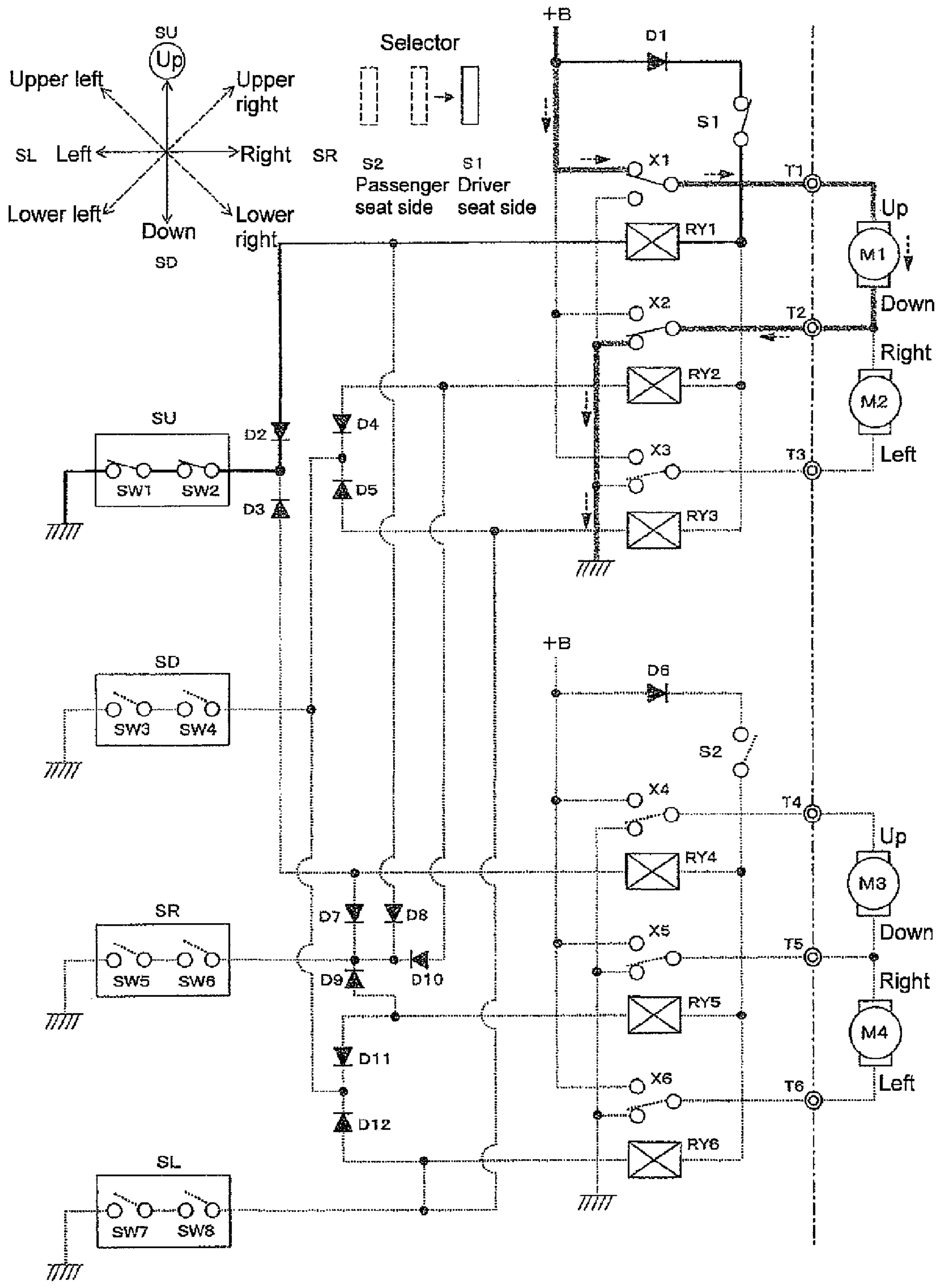
FIGS. 8 to 11 are circuit diagrams each showing actions for controlling a driver seat-side mirror in a case where the operation knob is actuated normally.

FIG. 8 shows a case where the operation knob 11 is actuated upward. Herein, since the selector knob 12 is switched to the driver seat side, the selector S1 is turned on and the selector S2 is turned off. Moreover, when the operation knob 11 is actuated, the switch contacts SW1 and SW2 of the up-direction switch SU are closed, so that the up-direction switch SU is turned on. As shown by a black, bold and solid line in FIG. 8, thus, a control current path is formed from the power supply +B to the ground through the diode D1, the selector S1, the relay RY1, the diode D2 and the up-direction switch SU, so that a control current flows into the relay RY1. Then, the relay RY1 is activated, and the contact X1 is switched to the power supply side. On the other hand, since no control current flows into each of the relays RY2 and RY3, each of the contacts X2 and X3 is still switched to the ground side. As shown by a gray, bold and solid line in FIG. 8, therefore, a drive current path is formed from the power supply +B to the ground through the contact X1, the terminal T1, the motor M1, the terminal T2 and the contact X2, so that a drive current flows into the motor M1 in a direction shown by a broken line with an arrow. Thus, the motor M1 rotates forward to allow the driver seat-side mirror 51 (see FIG. 6) to tilt such that the mirror side thereof is oriented upward.

Figure 9:
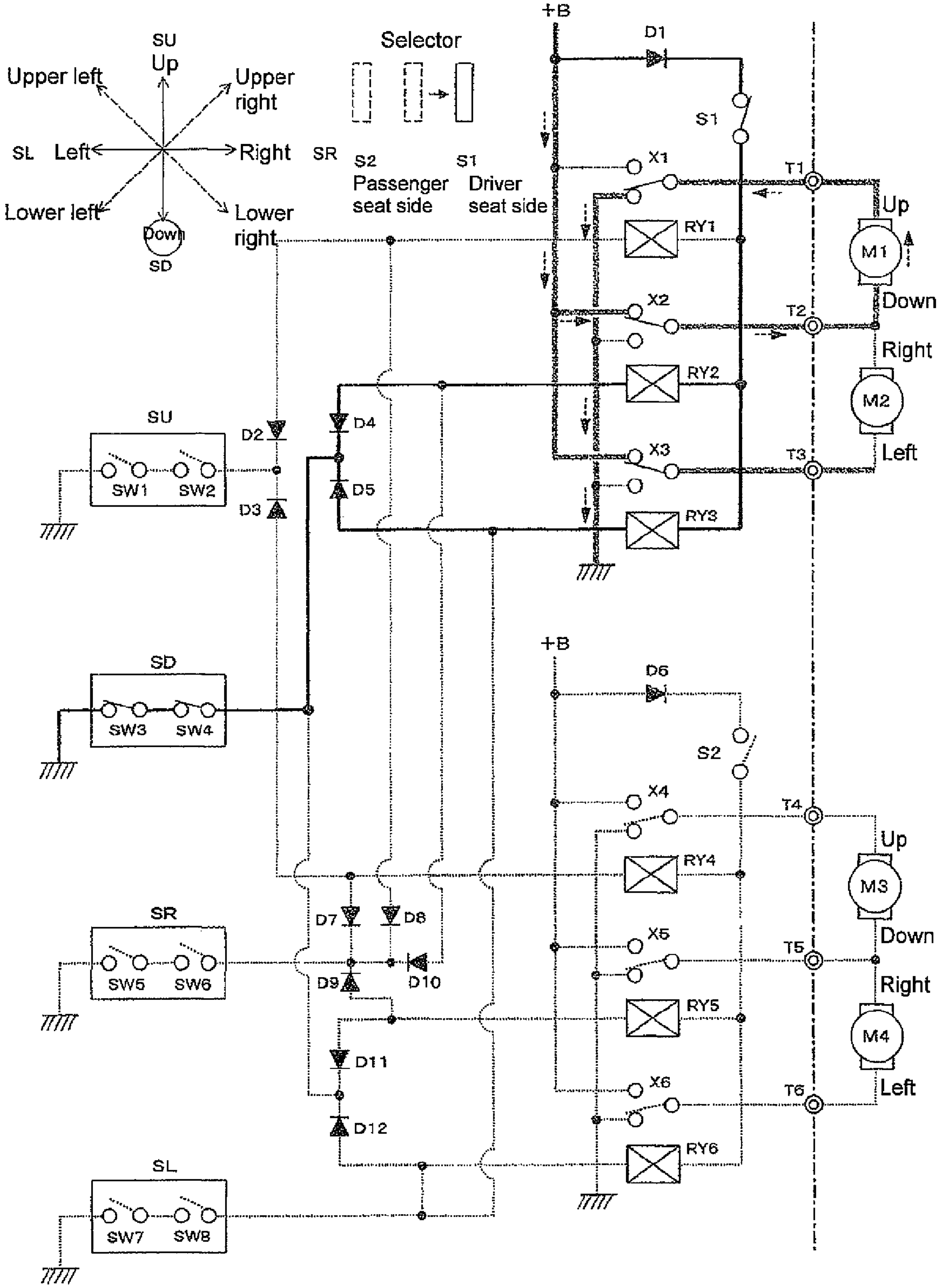

FIG. 9 shows a case where the operation knob 11 is actuated downward. Herein, since the selector knob 12 is switched to the driver seat side, the selector S1 is turned on and the selector S2 is turned off. Moreover, when the operation knob 11 is actuated, the switch contacts SW3 and SW4 of the down-direction switch SD are closed, so that the down-direction switch SD is turned on. As shown by a black, bold and solid line in FIG. 9, thus, a control current path is formed from the power supply +B to the ground through the diode D1, the selector S1, the relays RY2 and RY3, the diodes D4 and D5 and the down-direction switch SD, so that a control current flows into each of the relays RY2 and RY3. Then, each of the relays RY2 and RY3 is activated, and each of the contacts X2 and X3 is switched to the power supply side. On the other hand, since no control current flows into the relay RY1, the contact X1 is still switched to the ground side. As shown by a gray, bold and solid line in FIG. 9, therefore, a drive current path is formed from the power supply +B to the ground through the contact X2, the terminal T2, the motor M1, the terminal T1 and the contact X1, so that a drive current flows into the motor M1 in a direction shown by a broken line with an arrow. Thus, the motor M1 rotates backward to allow the driver seat-side mirror 51 (see FIG. 6) to tilt such that the mirror side thereof is oriented downward. Herein, when the contacts X2 and X3 are switched, voltages are applied from the power supply +B to the two ends of the motor M2. However, these voltages are equal in potential to each other; therefore, no electric current flows into the motor M2. For this reason, the motor M2 does not rotate.

Figure 10:
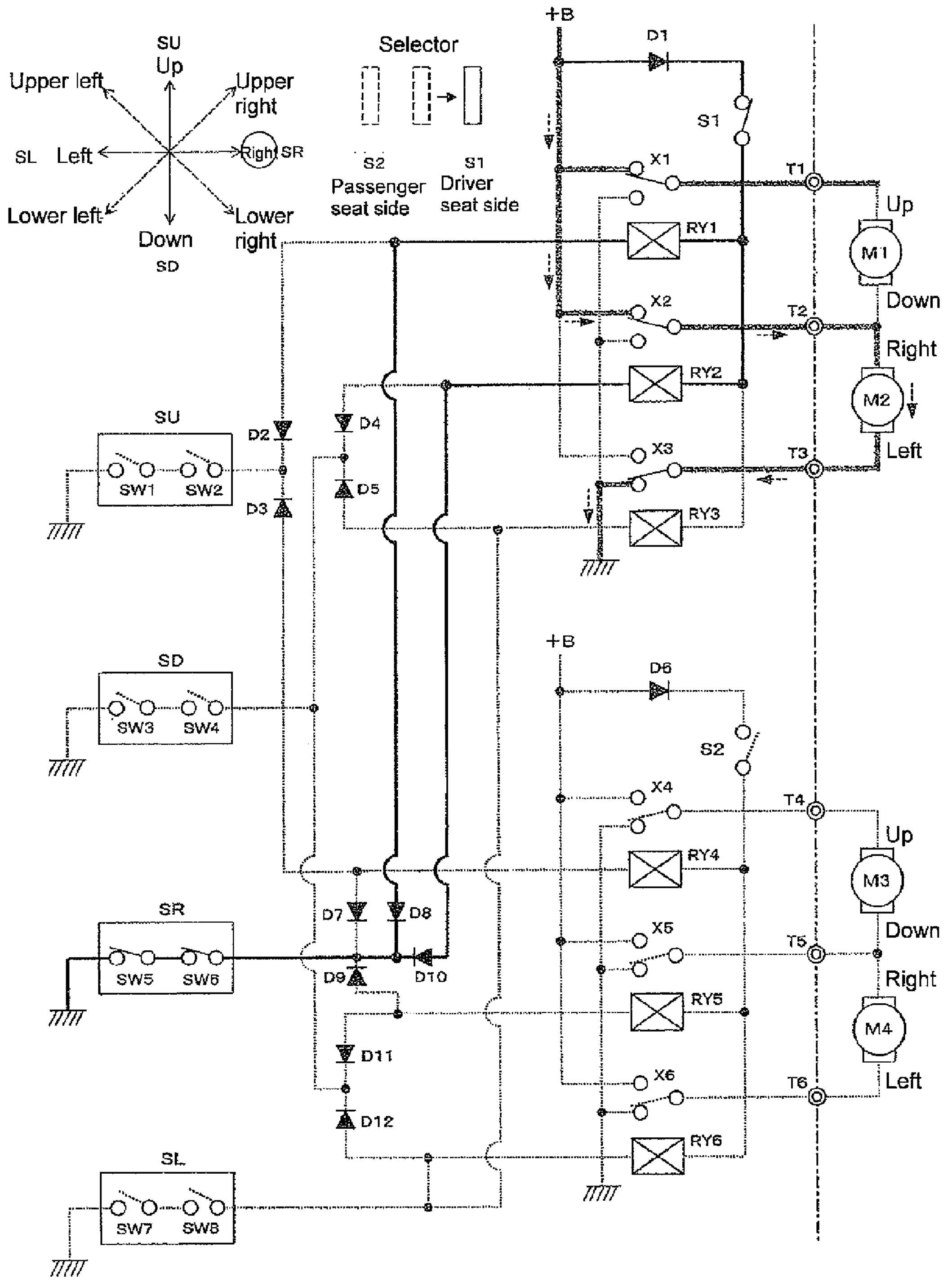

FIG. 10 shows a case where the operation knob 11 is actuated rightward. Herein, since the selector knob 12 is switched to the driver seat side, the selector S1 is turned on and the selector S2 is turned off. Moreover, when the operation knob 11 is actuated, the switch contacts SW5 and SW6 of the right-direction switch SR are closed, so that the right-direction switch SR is turned on. As shown by a black, bold and solid line in FIG. 10, thus, a control current path is formed from the power supply +B to the ground through the diode D1, the selector S1, the relays RY1 and RY2, the diodes D8 and D10 and the right-direction switch SR, so that a control current flows into each of the relays RY1 and RY2. Then, each of the relays RY1 and RY2 is activated, and each of the contacts X1 and X2 is switched to the power supply side. On the other hand, since no control current flows into the relay RY3, the contact X3 is still switched to the ground side. As shown by a gray, bold and solid line in FIG. 10, therefore, a drive current path is formed from the power supply +B to the ground through the contact X2, the terminal T2, the motor M2, the terminal T3 and the contact X3, so that a drive current flows into the motor M2 in a direction shown by a broken line with an arrow. Thus, the motor M2 rotates forward to allow the driver seat-side mirror 51 (see FIG. 6) to tilt such that the mirror side thereof is oriented rightward. Herein, when the contacts X1 and X2 are switched, voltages are applied from the power supply +B to the two ends of the motor M1. However, these voltages are equal in potential to each other; therefore, no electric current flows into the motor M1. For this reason, the motor M1 does not rotate.

Figure 11:
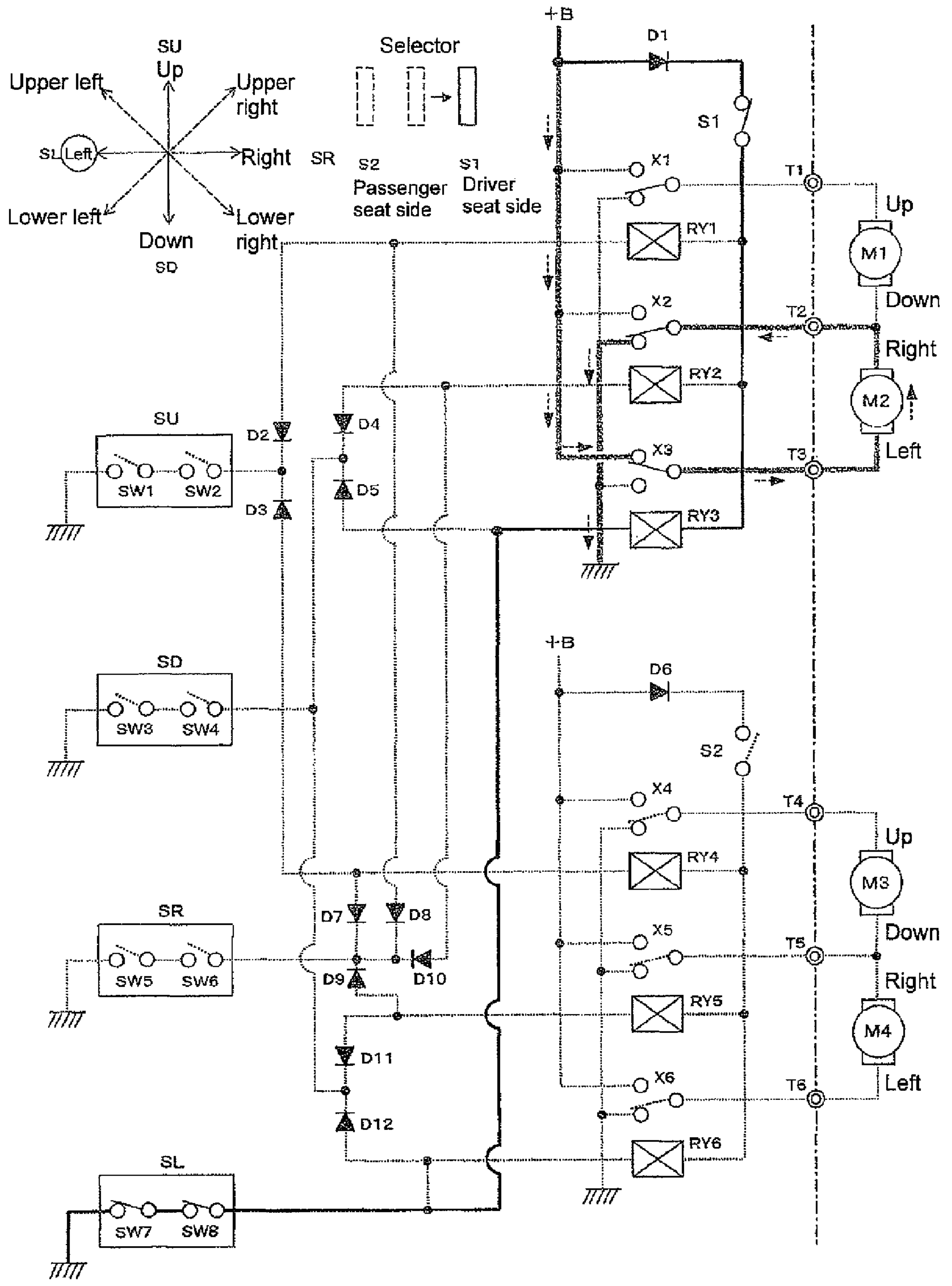

FIG. 11 shows a case where the operation knob 11 is actuated leftward. Herein, since the selector knob 12 is switched to the driver seat side, the selector S1 is turned on and the selector S2 is turned off. Moreover, when the operation knob 11 is actuated, the switch contacts SW7 and SW8 of the left-direction switch SL are closed, so that the left-direction switch SL is turned on. As shown by a black, bold and solid line in FIG. 11, thus, a control current path is formed from the power supply +B to the ground through the diode D1, the selector S1, the relay RY3 and the left-direction switch SL, so that a control current flows into the relay RY3. Then, the relay RY3 is activated, and the contact X3 is switched to the power supply side. On the other hand, since no control current flows into each of the relays RY1 and RY2, each of the contacts X1 and X2 is still switched to the ground side. As shown by a gray, bold and solid line in FIG. 11, therefore, a drive current path is formed from the power supply +B to the ground through the contact X3, the terminal T3, the motor M2, the terminal T2 and the contact X2, so that a drive current flows into the motor M2 in a direction shown by a broken line with an arrow. Thus, the motor M2 rotates backward to allow the driver seat-side mirror 51 (see FIG. 6) to tilt such that the mirror side thereof is oriented leftward.

FIG. 26 shows a table of the actions for controlling the driver seat-side mirror 51 in the case where the operation knob 11 is actuated normally. As shown in FIG. 26, when the operation knob 11 is actuated normally, that is, when the operation knob 11 is actuated in any one of the four directions, the motors M1 and M2 rotate in a direction corresponding to the actuated direction in accordance with the ON/OFF statuses of the relays RY1 to RY3, so that the driver seat-side mirror 51 tilts in the relevant direction.

With reference to FIGS. 12 to 15, next, description will be given of actions at the time when the operation knob 11 is actuated normally in a case where the selector knob 12 is switched to the passenger seat side (the left side).

Figure 12:
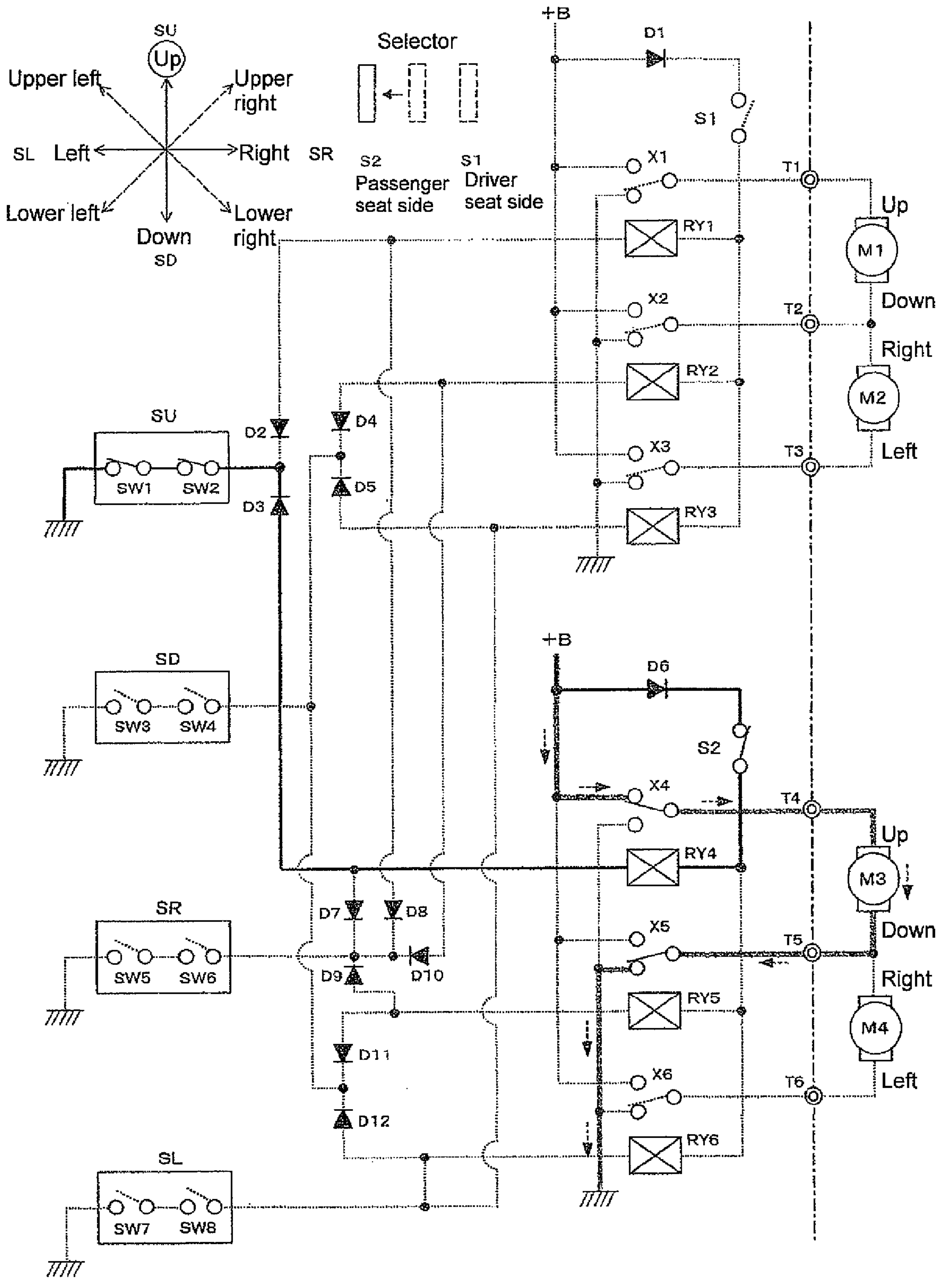
FIGS. 12 to 15 are circuit diagrams each showing actions for controlling a passenger seat-side mirror in the case where the operation knob is actuated normally.

FIG. 12 shows a case where the operation knob 11 is actuated upward. Herein, since the selector knob 12 is switched to the passenger seat side, the selector S2 is turned on and the selector S1 is turned off. Moreover, when the operation knob 11 is actuated, the switch contacts SW1 and SW2 of the up-direction switch SU are closed, so that the up-direction switch SU is turned on. As shown by a black, bold and solid line in FIG. 12, thus, a control current path is formed from the power supply +B to the ground through the diode D6, the selector S2, the relay RY4, the diode D3 and the up-direction switch SU, so that a control current flows into the relay RY4. Then, the relay RY4 is activated, and the contact X4 is switched to the power supply side. On the other hand, since no control current flows into each of the relays RY5 and RY6, each of the contacts X5 and X6 is still switched to the ground side. As shown by a gray, bold and solid line in FIG. 12, therefore, a drive current path is formed from the power supply +B to the ground through the contact X4, the terminal T4, the motor M3, the terminal T5 and the contact X5, so that a drive current flows into the motor M3 in a direction shown by a broken line with an arrow. Thus, the motor M3 rotates forward to allow the passenger seat-side mirror 52 (see FIG. 6) to tilt such that the mirror side thereof is oriented upward.

Figure 13:
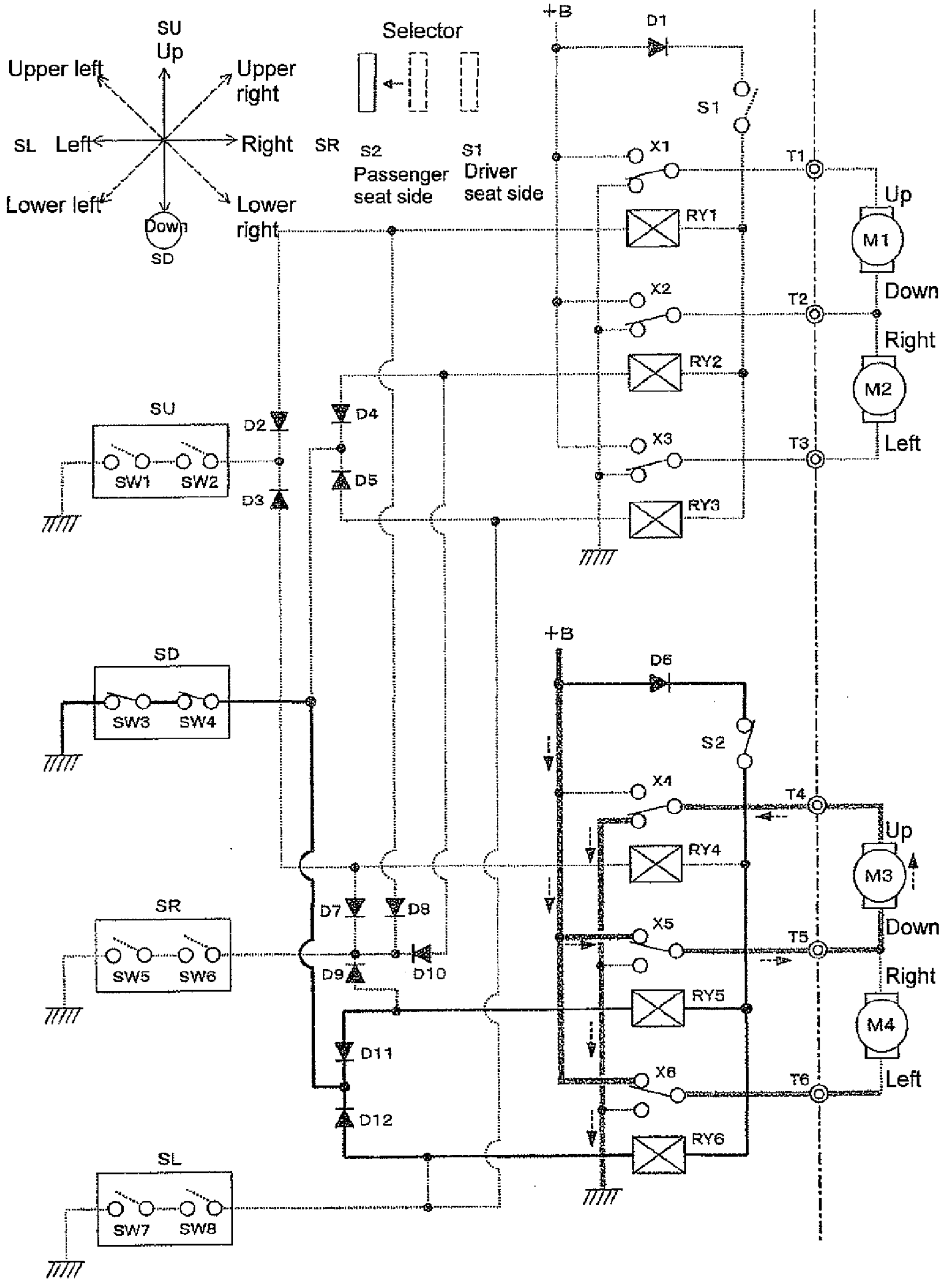

J FIG. 13 shows a case where the operation knob 11 is actuated downward. Herein, since the selector knob 12 is switched to the passenger seat side, the selector S2 is turned on and the selector S1 is turned off. Moreover, when the operation knob 11 is actuated, the switch contacts SW3 and SW4 of the down-direction switch SD are closed, so that the down-direction switch SD is turned on. As shown by a black, bold and solid line in FIG. 13, thus, a control current path is formed from the power supply +B to the ground through the diode D6, the selector S2, the relays RY5 and RY6, the diodes D11 and D12 and the down-direction switch SD, so that a control current flows into each of the relays RY5 and RY6. Then, each of the relays RY5 and RY6 is activated, and each of the contacts X5 and X6 is switched to the power supply side. On the other hand, since no control current flows into the relay RY4, the contact X4 is still switched to the ground side. As shown by a gray, bold and solid line in FIG. 13, therefore, a drive current path is formed from the power supply +B to the ground through the contact X5, the terminal T5, the motor M3, the terminal T4 and the contact X4, so that a drive current flows into the motor M3 in a direction shown by a broken line with an arrow. Thus, the motor M3 rotates backward to allow the passenger seat-side mirror 52 (see FIG. 6) to tilt such that the mirror side thereof is oriented downward. Herein, when the contacts X5 and X6 are switched, voltages are applied from the power supply +B to the two ends of the motor M4. However, these voltages are equal in potential to each other; therefore, no electric current flows into the motor M4. For this reason, the motor M4 does not rotate.

Figure 14:
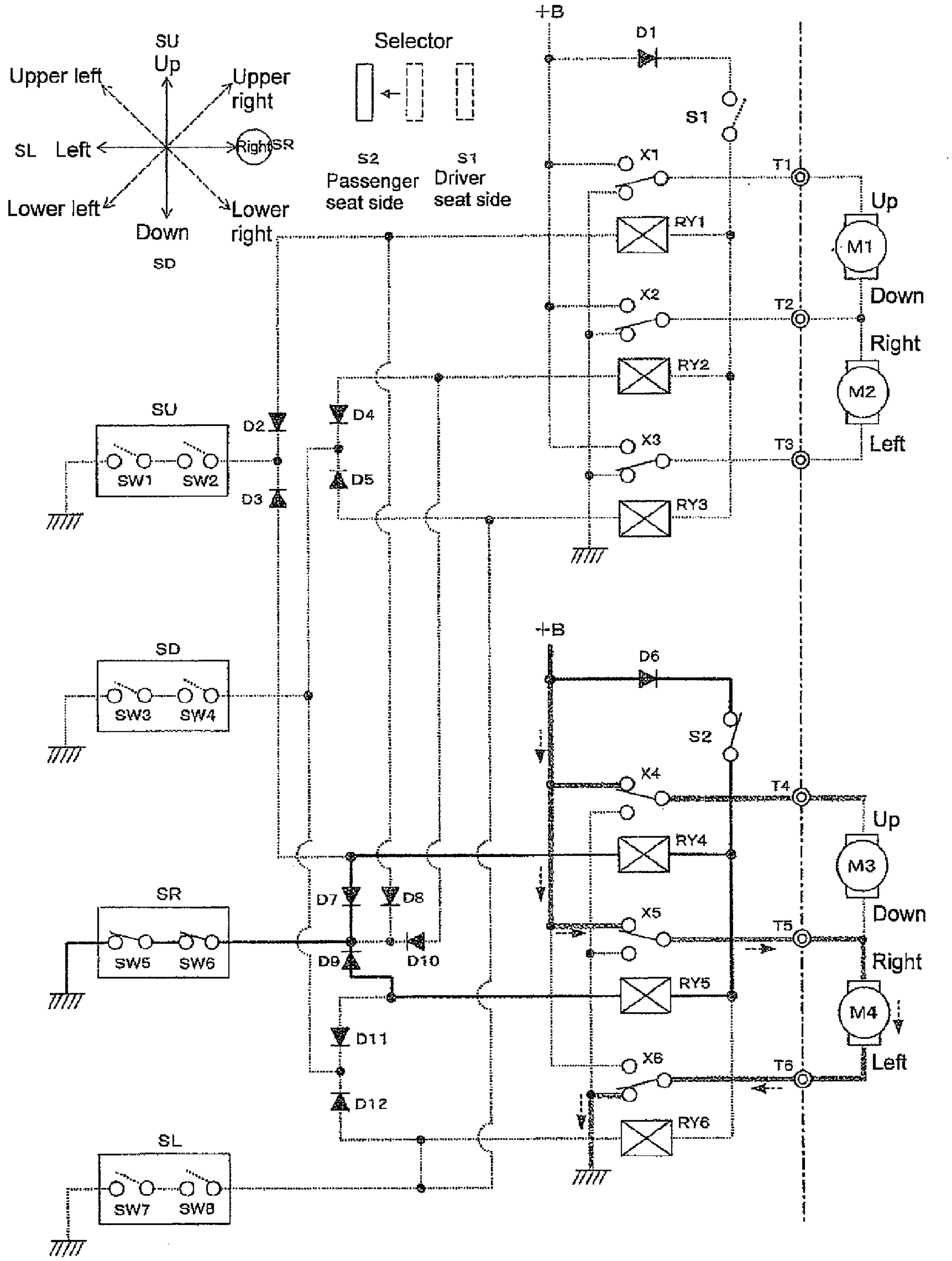

FIG. 14 shows a case where the operation knob 11 is actuated rightward. Herein, since the selector knob 12 is switched to the passenger seat side, the selector S2 is turned on and the selector S1 is turned off. Moreover, when the operation knob 11 is actuated, the switch contacts SW5 and SW6 of the right-direction switch SR are closed, so that the right-direction switch SR is turned on. As shown by a black, bold and solid line in FIG. 14, thus, a control current path is formed from the power supply +B to the ground through the diode D6, the selector S2, the relays RY4 and RY5, the diodes D7 and D9 and the right-direction switch SR, so that a control current flows into each of the relays RY4 and RY5. Then, each of the relays RY4 and RY5 is activated, and each of the contacts X4 and X5 is switched to the power supply side. On the other hand, since no control current flows into the relay RY6, the contact X6 is still switched to the ground side. As shown by a gray, bold and solid line in FIG. 14, therefore, a drive current path is formed from the power supply +B to the ground through the contact X5, the terminal T5, the motor M4, the terminal T6 and the contact X6, so that a drive current flows into the motor M4 in a direction shown by a broken line with an arrow. Thus, the motor M4 rotates forward to allow the passenger seat-side mirror 52 (see FIG. 6) to tilt such that the mirror side thereof is oriented rightward. Herein, when the contacts X4 and X5 are switched, voltages are applied from the power supply +B to the two ends of the motor M3. However, these voltages are equal in potential to each other; therefore, no electric current flows into the motor M3. For this reason, the motor M3 does not rotate.

Figure 15:
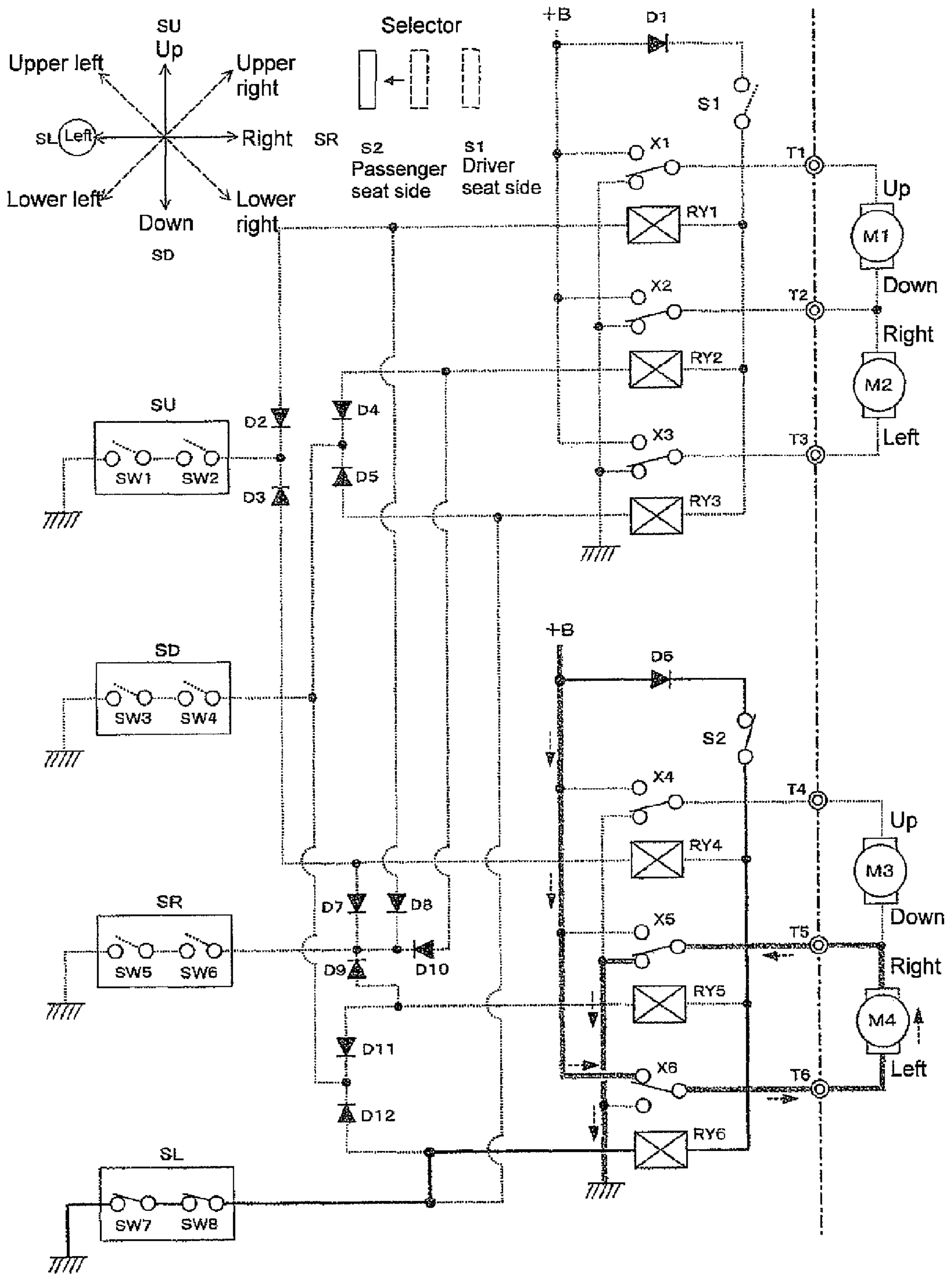

FIG. 15 shows a case where the operation knob 11 is actuated leftward. Herein, since the selector knob 12 is switched to the passenger seat side, the selector S2 is turned on and the selector S1 is turned off. Moreover when the operation knob 11 is actuated, the switch contacts SW7 and SW8 of the left-direction switch SL are closed, so that the left-direction switch SL is turned on. As shown by a black, bold and solid line in FIG. 15, thus, a control current path is formed from the power supply +B to the ground through the diode D6, the selector S2, the relay RY6 and the left-direction switch SL, so that a control current flows into the relay RY6. Then, the relay RY6 is activated, and the contact X6 is switched to the power supply side. On the other hand, since no control current flows into each of the relays RY4 and RY5, each of the contacts X4 and X5 is still switched to the ground side. As shown by a gray, bold and solid line in FIG. 15, therefore, a drive current path is formed from the power supply +B to the ground through the contact X6, the terminal T6, the motor M4, the terminal T5 and the contact X5, so that a drive current flows into the motor M4 in a direction shown by a broken line with an arrow. Thus, the motor M4 rotates backward to allow the passenger seat-side mirror 52 (see FIG. 6) to tilt such that the mirror side thereof is oriented leftward.

FIG. 27 shows a table of the actions for controlling the passenger seat-side mirror 52 in the case where the operation knob 11 is actuated normally. As shown in FIG. 27, when the operation knob 11 is actuated normally, that is, when the actuation knob 11 is actuated in any one of the four directions, the motors M3 and M4 rotate in a direction corresponding to the actuated direction in accordance with the ON/OFF statuses of the relays RY4 to RY6, so that the passenger seat-side mirror 52 tilts in the relevant direction.

(2) Case Where Operation Knob is Actuated Obliquely

With reference to FIGS. 16 to 19, first, description will be given of actions at the time when the operation knob 11 is actuated obliquely in a case where the selector knob 12 is switched to the driver seat side (the right side).

Figure 16:
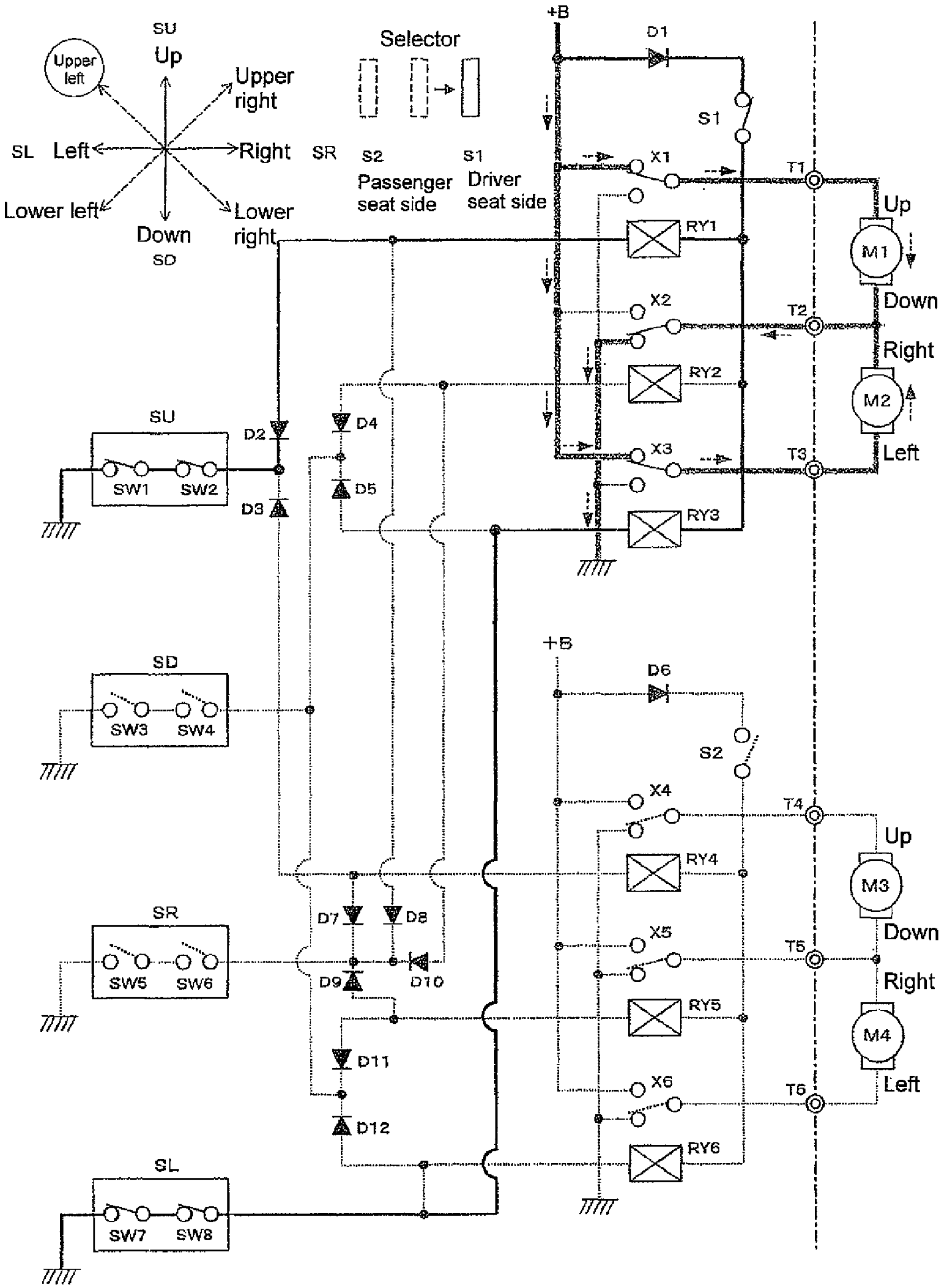
FIGS. 16 to 19 are circuit diagrams each showing actions for controlling the driver seat-side mirror in a case where the operation knob is actuated obliquely.

FIG. 16 shows a case where the operation knob 11 is actuated obliquely in an upper left direction. Herein, since the selector knob 12 is switched to the driver seat side, the selector S1 is turned on and the selector S2 is turned off. Moreover, when the operation knob 11 is actuated obliquely, the switch contacts SW1 and SW2 of the up-direction switch SU are closed, so that the up-direction switch SU is turned on. In addition, the switch contacts SW7 and SW8 of the left-direction switch SL are closed, so that the left-direction switch SL is turned on. As shown by a black, bold and solid line in FIG. 16, thus, a control current path is formed from the power supply +B to the ground through the diode D1, the selector S1, the relay RY1, the diode D2 and the up-direction switch SU and, also, a control current path is formed from the power supply +B to the ground through the diode D1, the selector S1, the relay RY3 and the left-direction switch SL, so that a control current flows into each of the relays RY1 and RY3. Then, each of the relays RY1 and RY3 is activated, and each of the contacts X1 and X3 is switched to the power supply side. On the other hand, since no control current flows into the relay RY2, the contact X2 is still switched to the ground side. As shown by a gray, bold and solid line in FIG. 16, therefore, a drive current path is formed from the power supply +B to the ground through the contact X1, the terminal T1, the motor M1, the terminal T2 and the contact X2 and, also, a drive current path is formed from the power supply +B to the ground through the contact X3, the terminal T3, the motor M2, the terminal T2 and the contact X2, so that a drive current flows into each of the motors M1 and M2 in a direction shown by a broken line with an arrow. Thus, the motor M1 rotates forward to allow the driver seat-side mirror 51 (see FIG. 6) to tilt such that the mirror side thereof is oriented upward, and the motor M2 rotates backward to allow the driver seat-side mirror 51 to tilt such that the mirror side thereof is oriented leftward. As a result, the mirror side of the driver seat-side mirror 51 is oriented in the upper left direction.

Figure 17:
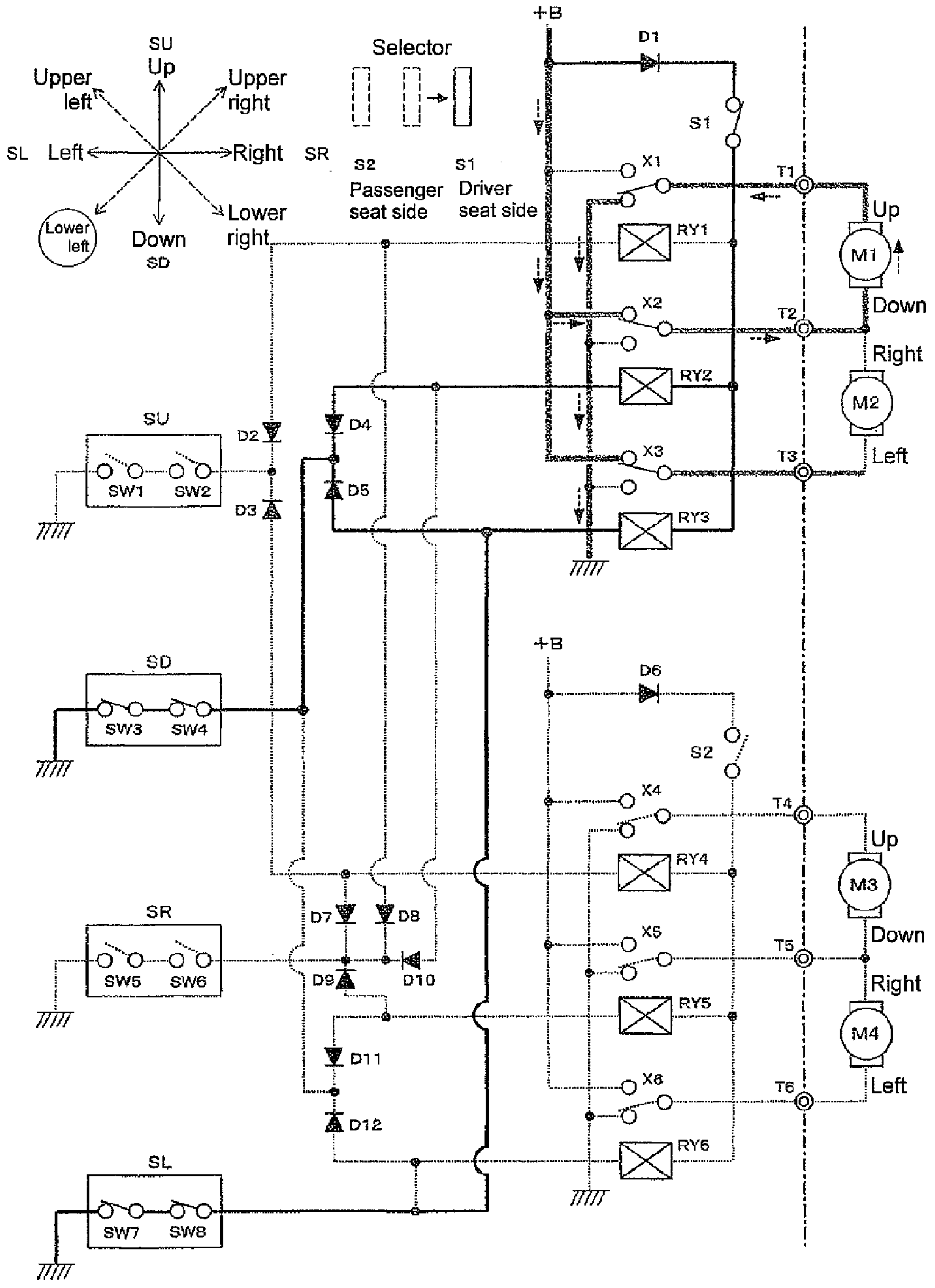

FIG. 17 shows a case where the operation knob 11 is actuated obliquely in a lower left direction. Herein, since the selector knob 12 is switched to the driver seat side, the selector S1 is turned on and the selector S2 is turned off. Moreover, when the operation knob 11 is actuated obliquely, the switch contacts SW3 and SW4 of the down-direction switch SD are closed, so that the down-direction switch SD is turned on. In addition, the switch contacts SW7 and SW8 of the left-direction switch SL are closed, so that the left-direction switch SL is turned on. As shown by a black, bold and solid line in FIG. 17, thus, a control current path is formed from the power supply +B to the ground through the diode D1, the selector S1, the relays RY2 and RY3, the diodes D4 and D5 and the down-direction switch SD and, also, a control current path is formed from the power supply +B to the ground through the diode D1, the selector S1, the relay RY3 and the left-direction switch SL, so that a control current flows into each of the relays RY2 and RY3. Then, each of the relays RY2 and RY3 is activated, and each of the contacts X2 and X3 is switched to the power supply side. On the other hand, since no control current flows into the relay RY1, the contact X1 is still switched to the ground side. As shown by a gray, bold and solid line in FIG. 17, therefore, a drive current path is formed from the power supply +B to the ground through the contact X2, the terminal T2, the motor M1, the terminal T1 and the contact X1, so that a drive current flows into the motor M1 in a direction shown by a broken line with an arrow. Thus, the motor M1 rotates backward to allow the driver seat-side mirror 51 (see FIG. 6) to tilt such that the mirror side thereof is oriented downward. Herein, when the contacts X2 and X3 are switched, voltages are applied from the power supply +B to the two ends of the motor M2. However, these voltages are equal in potential to each other; therefore, no electric current flows into the motor M2. For this reason, the motor M2 does not rotate.

Figure 18:
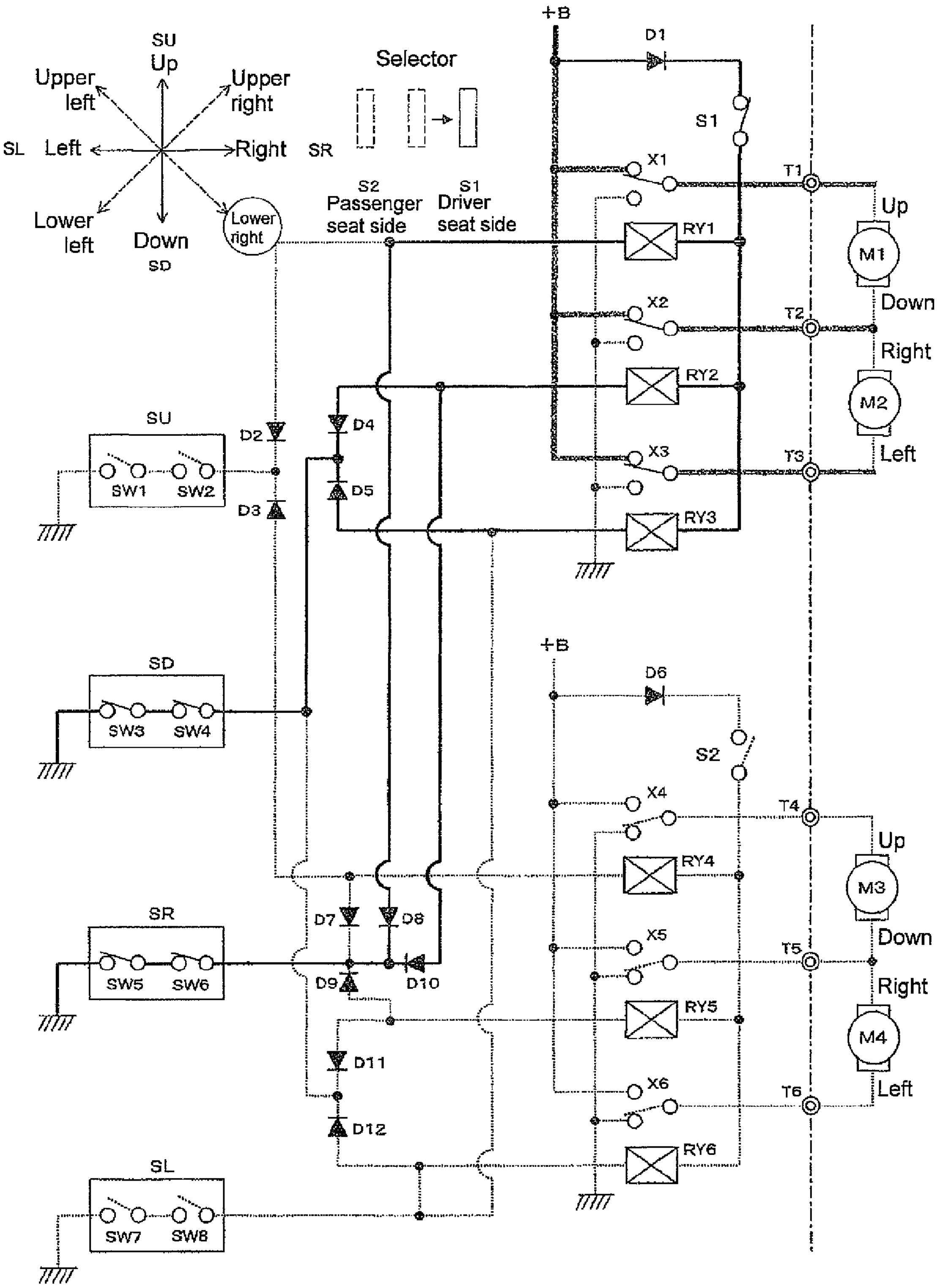

FIG. 18 shows a case where the operation knob 11 is actuated obliquely in a lower right direction. Herein, since the selector knob 12 is switched to the driver seat side, the selector S1 is turned on and the selector S2 is turned off. Moreover, when the operation knob 11 is actuated obliquely, the switch contacts SW3 and SW4 of the down-direction switch SD are closed, so that the down-direction switch SD is turned on. In addition, the switch contacts SW5 and SW6 of the right-direction switch SR are closed, so that the right-direction switch SR is turned on. As shown by a black, bold and solid line in FIG. 18, thus, a control current path is formed from the power supply +B to the ground through the diode D1, the selector S1, the relays RY1 and RY2, the diodes D8 and D10 and the right-direction switch SR and, also, a control current path is formed from the power supply +B to the ground through the diode D1, the selector S1, the relays RY2 and RY3, the diodes D4 and D5 and the down-direction switch SD, so that a control current flows into each of the relays RY1 to RY3. Then, each of the relays RY1 to RY3 is activated, and each of the contacts X1 to X3 is switched to the power supply side. As a result, voltages are applied from the power supply +B to the two ends of the motor M1 through the contacts X1 and X2. However, these voltages are equal in potential to each other; therefore, no electric current flows into the motor M1. Moreover, voltages are applied from the power supply +B to the two ends of the motor M2 through the contacts X2 and X3. However, these voltages are also equal in potential to each other; therefore, no electric current flows into the motor M2. For these reasons, since each of the motors M1 and M2 does not rotate, the driver seat-side mirror 51 (see FIG. 6) does not tilt.

Figure 19:
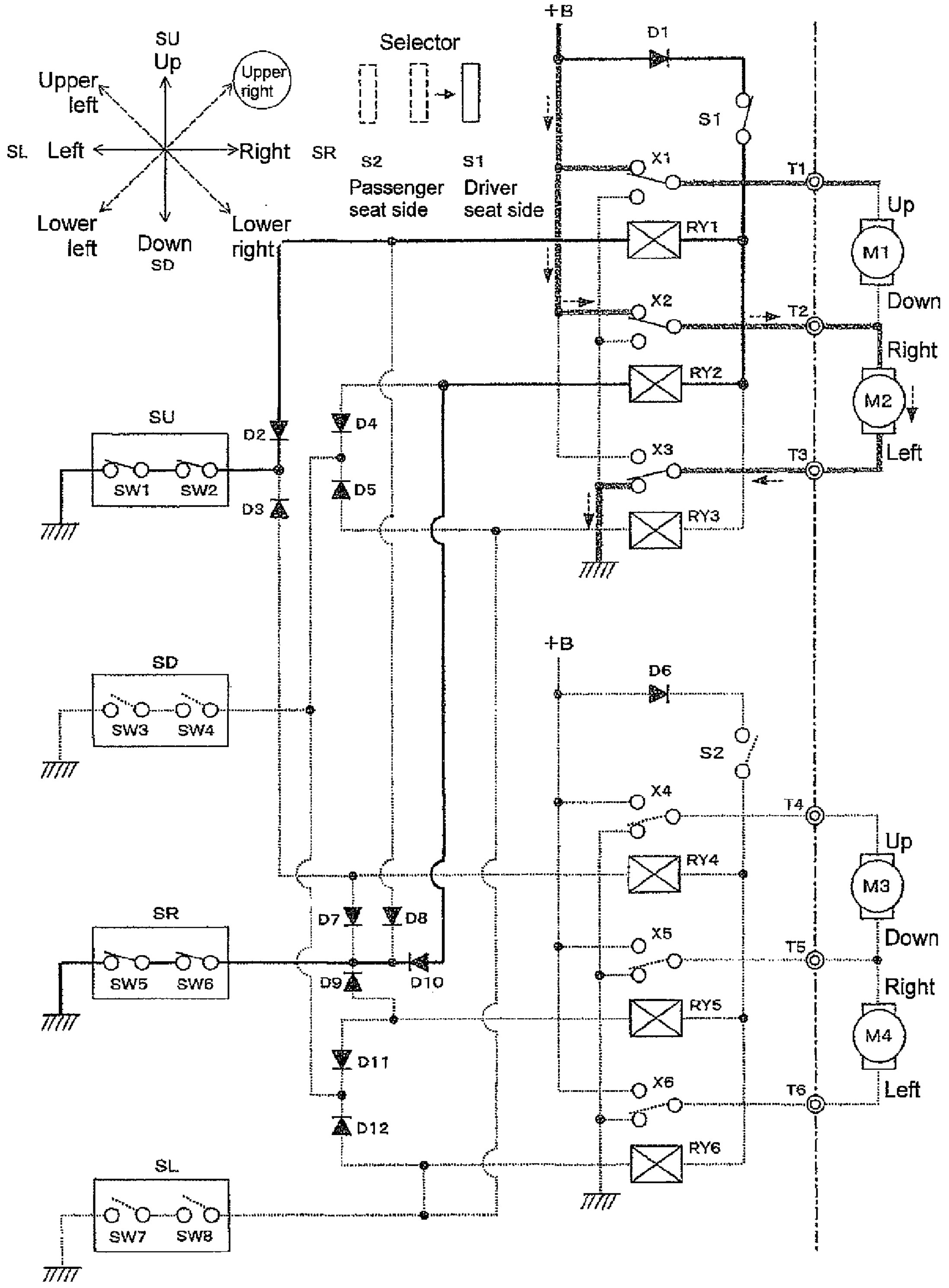

FIG. 19 shows a case where the operation knob 11 is actuated obliquely in an upper right direction. Herein, since the selector knob 12 is switched to the driver seat side, the selector S1 is turned on and the selector S2 is turned off. Moreover, when the operation knob 11 is actuated obliquely, the switch contacts SW1 and SW2 of the up-direction switch SU are closed, so that the up-direction switch SU is turned on. In addition, the switch contacts SW5 and SW6 of the right-direction switch SR are closed, so that the right-direction switch SR is turned on. As shown by a black, bold and solid line in FIG. 19, thus, a control current path is formed from the power supply +B to the ground through the diode D1, the selector S1, the relay RY1 the diode D2 and the up-direction switch SU and, also, a control current path is formed from the power supply +B to the ground through the diode D1, the selector S1, the relay RY2, the diode D10 and the right-direction switch SR, so that a control current flows into each of the relays RY1 and RY2. Then, each of the relays RY1 and RY2 is activated, and each of the contacts X1 and X2 is switched to the power supply side. On the other hand, since no control current flows into the relay RY3, the contact X3 is still switched to the ground side. As shown by a gray, bold and solid line in FIG. 19, therefore, a drive current path is formed from the power supply +B to the ground through the contact X2, the terminal T2, the motor M2, the terminal T3 and the contact X3, so that a drive current flows into the motor M2 in a direction shown by a broken line with an arrow. Thus, the motor M2 rotates forward to allow the driver seat-side mirror 51 (see FIG. 6) to tilt such that the mirror side thereof is oriented rightward. Herein, when the contacts X1 and X2 are switched, voltages are applied from the power supply +B to the two ends of the motor M1. However, these voltages are equal in potential to each other; therefore, no electric current flows into the motor M1. For this reason, the motor M1 does not rotate.

FIG. 28 shows a table of the actions for controlling the driver seat-side mirror 51 in the case where the operation knob 11 is actuated obliquely. As shown in FIG. 28, when the operation knob 11 is actuated obliquely, that is, when the operation knob 11 is actuated in two directions, the motors M1 and M2 are controlled as follows in accordance with the ON/OFF statuses of the relays RY1 to RY3. That is, if the operation knob 11 is actuated obliquely in the upper left direction, each of the motors M1 and M2 rotates to allow the driver seat-side mirror 51 to tilt in the upper left direction. However, if the operation knob 11 is actuated obliquely in the lower left direction or the upper right direction, only one of the motors M1 and M2 rotates to allow the driver seat-side mirror 51 to tilt downward or rightward. Moreover, if the operation knob 11 is actuated obliquely in the lower right direction, both the motors M1 and M2 do not rotate, so that the driver seat-side mirror 51 does not tilt. As described above, in the case where the operation knob 11 is actuated obliquely in a direction other than the upper left direction, the driver seat-side mirror 51 does not tilt so as to correspond to the relevant direction. In other words, this configuration prevents unnatural actions, for example, the driver seat-side mirror 51 tilts upward even though the operation knob 11 is actuated obliquely in the lower left direction and the driver seat-side mirror 51 tilts leftward even though the operation knob 11 is actuated obliquely in the upper right direction.

With reference to FIGS. 20 to 23, next, description will be given of actions at the time when the operation knob 11 is actuated obliquely in a case where the selector knob 12 is switched to the passenger seat side (the left side).

Figure 20:
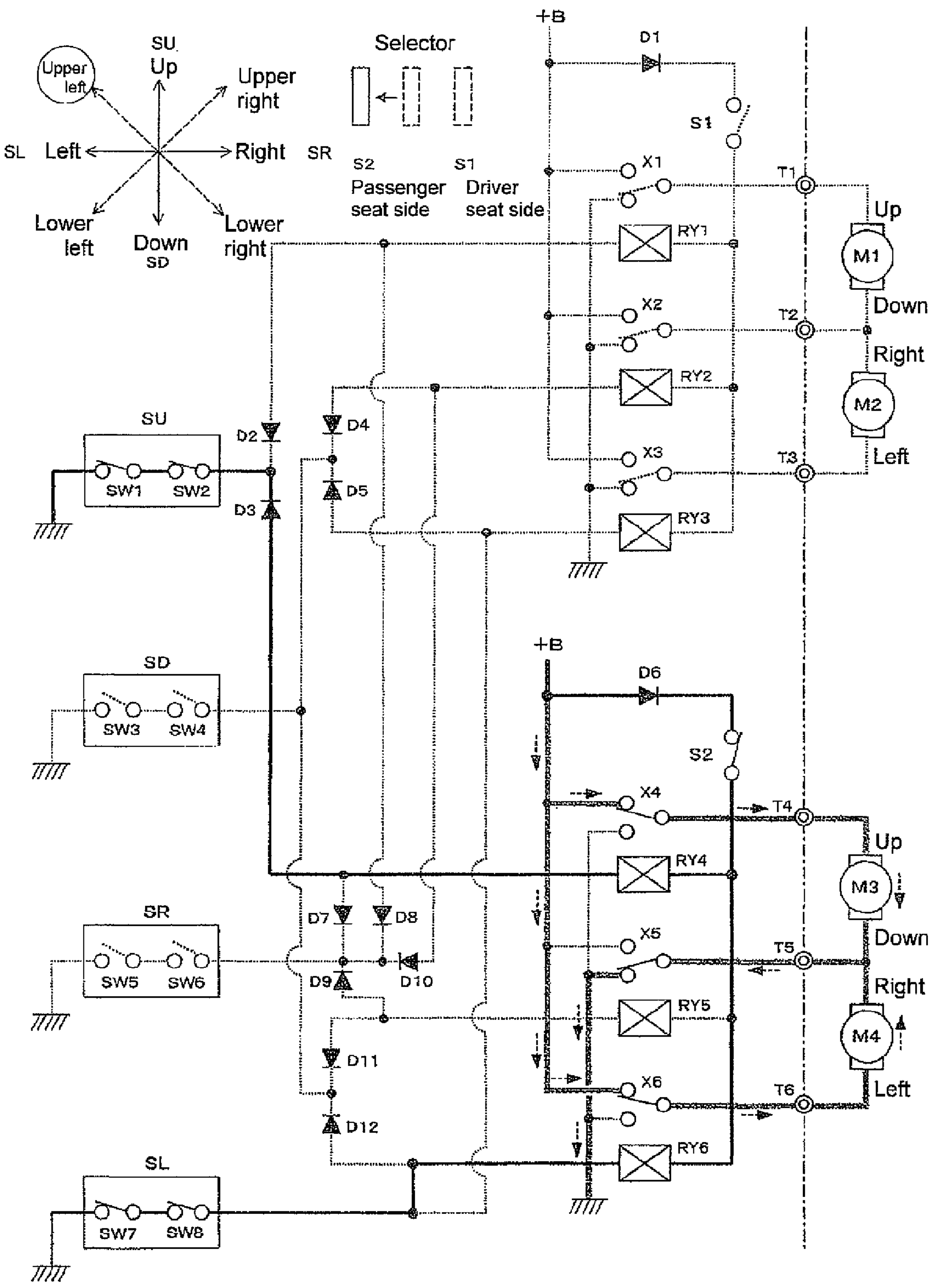
FIGS. 20 to 23 are circuit diagrams each showing actions for controlling the passenger seat-side mirror in the case where the operation knob is actuated obliquely.

FIG. 20 shows a case where the operation knob 11 is actuated obliquely in the upper left direction. Herein, since the selector knob 12 is switched to the passenger seat side, the selector S2 is turned on and the selector S1 is turned off. Moreover, when the operation knob 11 is actuated obliquely, the switch contacts SW1 and SW2 of the up-direction switch SU are closed, so that the up-direction switch SU is turned on. In addition, the switch contacts SW7 and SW8 of the left-direction switch SL are closed, so that the left-direction switch SL is turned on. As shown by a black, bold and solid line in FIG. 20, thus, a control current path is formed from the power supply +B to the ground through the diode D6, the selector S2, the relay RY4, the diode D3 and the up-direction switch SU and, also, a control current path is formed from the power supply +B to the ground through the diode D6, the selector S2, the relay RY6 and the left-direction switch SL, so that a control current flows into each of the relays RY4 and RY6. Then, each of the relays RY4 and RY6 is activated, and each of the contacts X4 and X6 is switched to the power supply side. On the other hand, since no control current flows into the relay RY5, the contact X5 is still switched to the ground side. As shown by a gray, bold and solid line in FIG. 20, therefore, a drive current path is formed from the power supply +B to the ground through the contact X4, the terminal T4, the motor M3, the terminal T5 and the contact X5 and, also, a drive current path is formed from the power supply +B to the ground through the contact X6, the terminal T6, the motor M4, the terminal T5 and the contact X5, so that a drive current flows into each of the motors M3 and M4 in a direction shown by a broken line with an arrow. Thus, the motor M3 rotates forward to allow the passenger seat-side mirror 52 (see FIG. 6) to tilt such that the mirror side thereof is oriented upward, and the motor M4 rotates backward to allow the passenger seat-side mirror 52 to tilt such that the mirror side thereof is oriented leftward. As a result, the mirror side of the passenger seat-side mirror 52 is oriented in the upper left direction.

Figure 21:
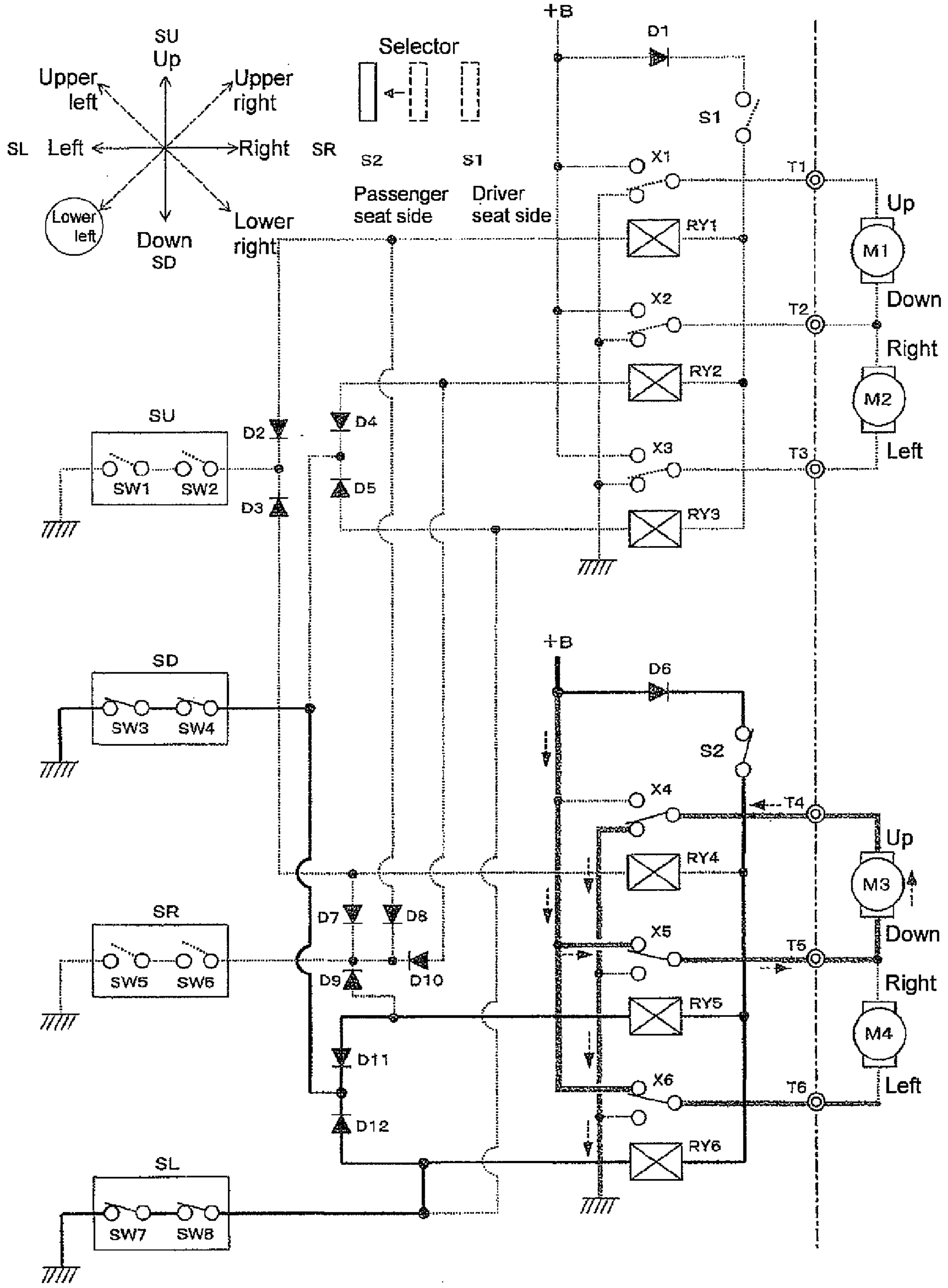

FIG. 21 shows a case where the operation knob 11 is actuated obliquely in the lower left direction. Herein, since the selector knob 12 is switched to the passenger seat side, the selector S2 is turned on and the selector S1 is turned off. Moreover, when the operation knob 11 is actuated obliquely, the switch contacts SW3 and SW4 of the down-direction switch SD are closed, so that the down-direction switch SD is turned on. In addition, the switch contacts SW7 and SW8 of the left-direction switch SL are closed, so that the left-direction switch SL is turned on. As shown by a black, bold and solid line in FIG. 21, thus, a control current path is formed from the power supply +B to the ground through the diode D6, the selector S2, the relays RY5 and RY6, the diodes D11 and D12 and the down-direction switch SD and, also, a control current path is formed from the power supply +B to the ground through the diode D6, the selector S2, the relay RY6 and the left-direction switch SL, so that a control current flows into each of the relays RY5 and RY6. Then, each of the relays RY5 and RY6 is activated, and each of the contacts X5 and X6 is switched to the power supply side. On the other hand, since no control current flows into the relay RY4, the contact X4 is still switched to the ground side. As shown by a gray, bold and solid line in FIG. 21, therefore, a drive current path is formed from the power supply +B to the ground through the contact X5, the terminal T5, the motor M3, the terminal T4 and the contact X4, so that a drive current flows into the motor M3 in a direction shown by a broken line with an arrow. Thus, the motor M3 rotates backward to allow the passenger seat-side mirror 52 (see FIG. 6) to tilt such that the mirror side thereof is oriented downward. Herein, when the contacts X5 and X6 are switched, voltages are applied from the power supply +B to the two ends of the motor M4. However, these voltages are equal in potential to each other; therefore, no electric current flows into the motor M4. For this reason, the motor M4 does not rotate.

Figure 22:
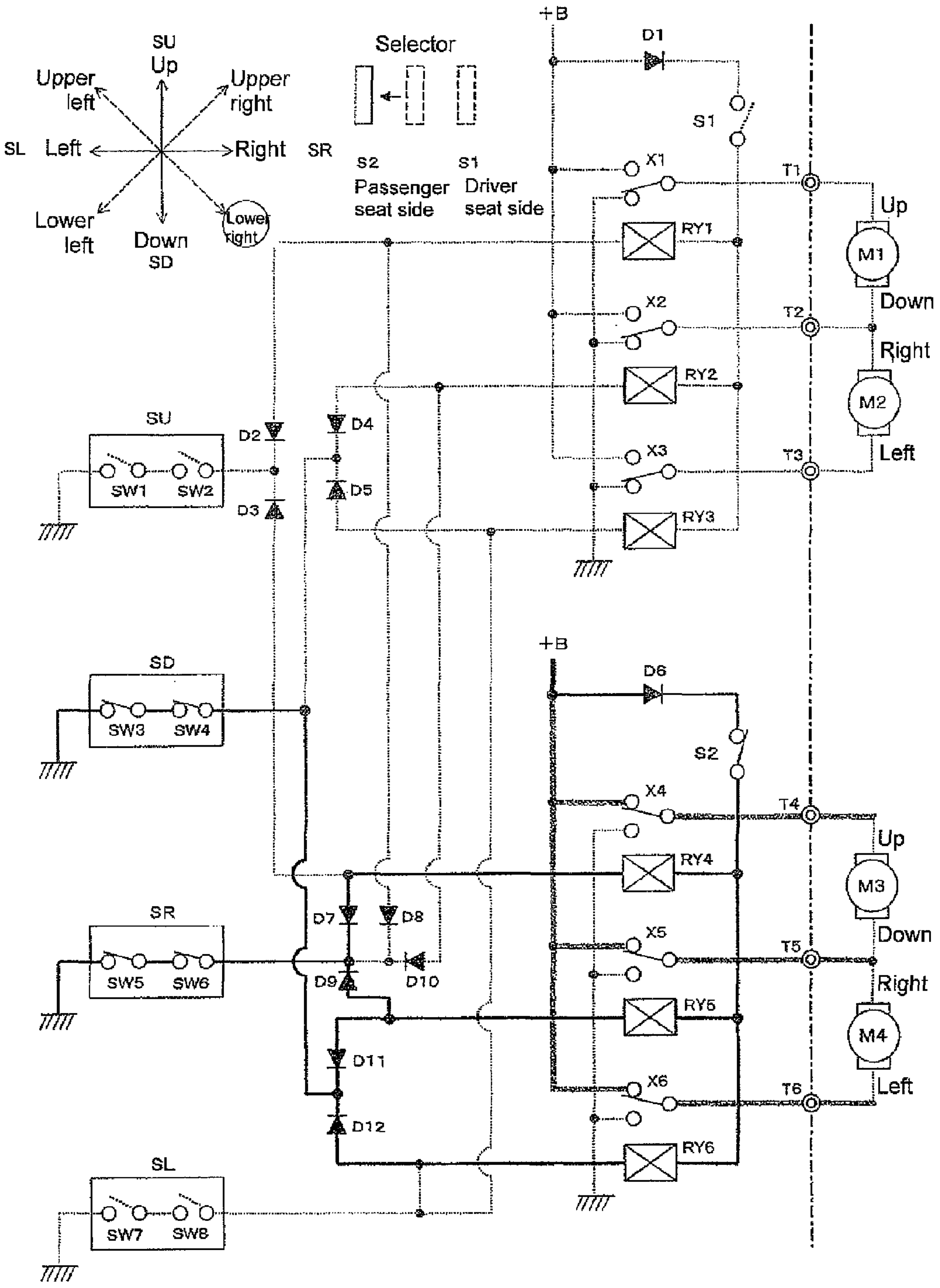

FIG. 22 shows a case where the operation knob 11 is actuated obliquely in the lower right direction. Herein, since the selector knob 12 is switched to the passenger seat side, the selector S2 is turned on and the selector S1 is turned off. Moreover, when the operation knob 11 is actuated obliquely, the switch contacts SW3 and SW4 of the down-direction switch SD are closed, so that the down-direction switch SD is turned on. In addition, the switch contacts SW5 and SW6 of the right-direction switch SR are closed, so that the right-direction switch SR is turned on. As shown by a black, bold and solid line in FIG. 22, thus, a control current path is formed from the power supply +B to the ground through the diode D6, the selector S2, the relays RY4 and RY5, the diodes D7 and D9 and the right-direction switch SR and, also, a control current path is formed from the power supply +B to the ground through the diode D6, the selector S2, the relays RY5 and RY6, the diodes D11 and D12 and the down-direction switch SD, so that a control current flows into each of the relays RY4 to RY6. Then, each of the relays RY4 to RY6 is activated, and each of the contacts X4 to X6 is switched to the power supply side. As a result, voltages are applied from the power supply +B to the two ends of the motor M3 through the contacts X4 and X5. However, these voltages are equal in potential to each other; therefore, no electric current flows into the motor M3. Moreover, voltages are applied from the power supply +B to the two ends of the motor M4 through the contacts X5 and X6. However, these voltages are also equal in potential to each other; therefore, no electric current flows into the motor M4. For these reasons, since each of the motors M3 and M4 does not rotate, the passenger seat-side mirror 52 (see FIG. 6) does not tilt.

Figure 23:
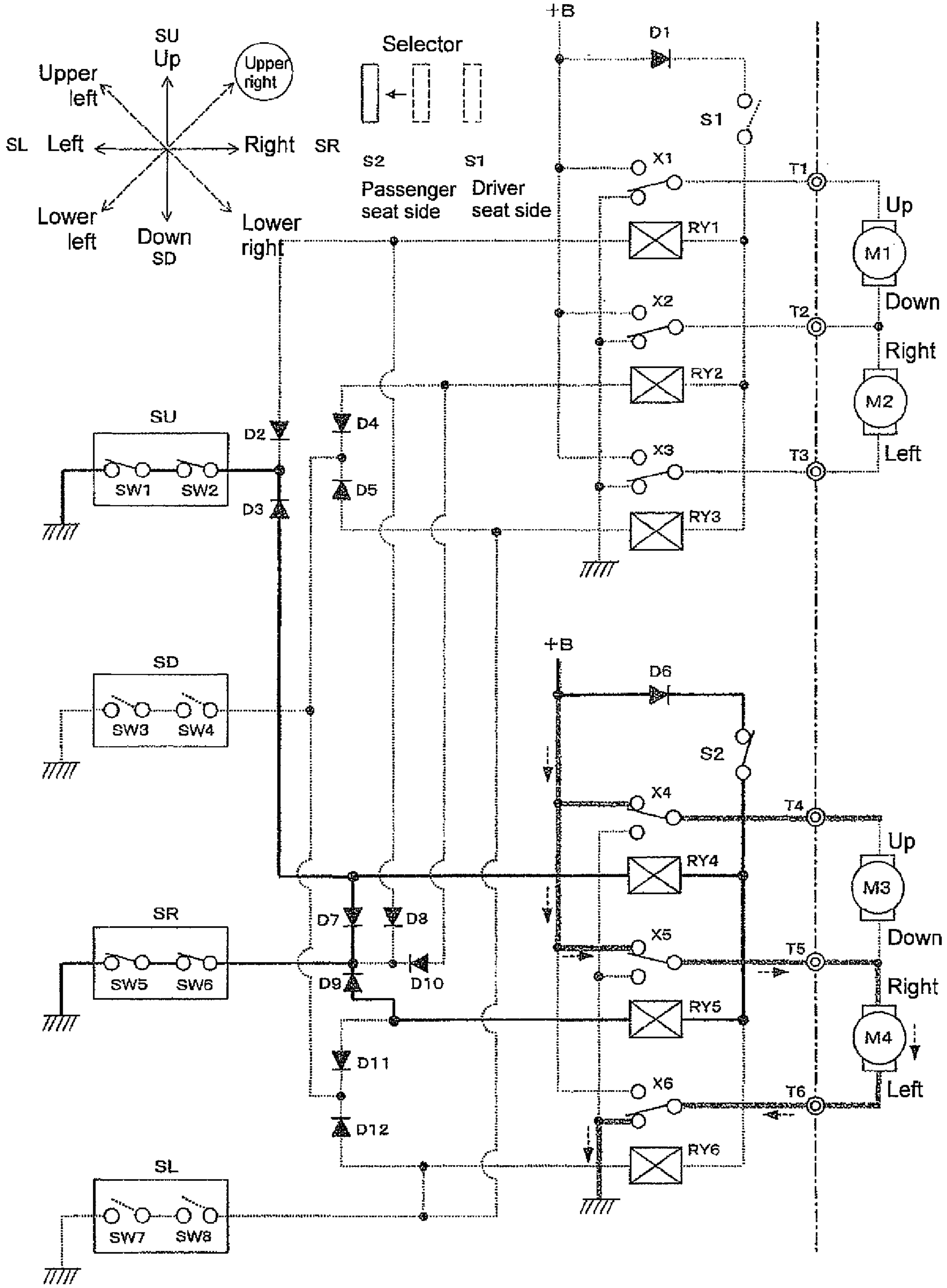

FIG. 23 shows a case where the operation knob 11 is actuated obliquely in the upper right direction. Herein, since the selector knob 12 is switched to the passenger seat side, the selector S2 is turned on and the selector S1 is turned off. Moreover, when the operation knob 11 is actuated obliquely, the switch contacts SW1 and SW2 of the up-direction switch SU are closed, so that the up-direction switch SU is turned on. In addition, the switch contacts SW5 and SW6 of the right-direction switch SR are closed, so that the right-direction switch SR is turned on. As shown by a black, bold and solid line in FIG. 23, thus, a control current path is formed from the power supply +B to the ground through the diode D6, the selector S2, the relay RY4, the diode D3 and the up-direction switch SU and, also, a control current path is formed from the power supply +B to the ground through the diode D6, the selector S2, the relays RY4 and RY5, the diodes D7 and D9 and the right-direction switch SR, so that a control current flows into each of the relays RY4 and RY5. Then, each of the relays RY4 and RY5 is activated, and each of the contacts X4 and X5 is switched to the power supply side. On the other hand, since no control current flows into the relay RY6, the contact X6 is still switched to the ground side. As shown by a gray, bold and solid line in FIG. 23, therefore, a drive current path is formed from the power supply +B to the ground through the contact X5, the terminal T5, the motor M4, the terminal T6 and the contact X6, so that a drive current flows into the motor M4 in a direction shown by a broken line with an arrow. Thus, the motor M4 rotates forward to allow the passenger seat-side mirror 52 (see FIG. 6) to tilt such that the mirror side thereof is oriented rightward. Herein, when the contacts X4 and X5 are switched, voltages are applied from the power supply +B to the two ends of the motor M3. However, these voltages are equal in potential to each other; therefore, no electric current flows into the motor M3. For this reason, the motor M3 does not rotate.

FIG. 29 shows a table of the actions for controlling the passenger seat-side mirror 52 in the case where the operation knob 11 is actuated obliquely. As shown in FIG. 29, when the operation knob 11 is actuated obliquely, that is, when the operation knob 11 is actuated in two directions, the motors M3 and M4 are controlled as follows in accordance with the ON/OFF statuses of the relays RY4 to RY6. That is, if the operation knob 11 is actuated obliquely in the upper left direction, each of the motors M3 and M4 rotates to allow the passenger seat-side mirror 52 to tilt in the upper left direction. However, if the operation knob 11 is actuated obliquely in the lower left direction or the upper right direction, only one of the motors M3 and M4 rotates to allow the passenger seat-side mirror 52 to tilt downward or rightward. Moreover, if the operation knob 11 is actuated obliquely in the lower right direction, both the motors M3 and M4 do not rotate, so that the passenger seat-side mirror 52 does not tilt. As described above, in the case where the operation knob 11 is actuated obliquely in a direction other than the upper left direction, the passenger seat-side mirror 52 does not tilt so as to correspond to the relevant direction. In other words, this configuration prevents unnatural actions, for example, the passenger seat-side mirror 52 tilts upward even though the operation knob 11 is actuated obliquely in the lower left direction and the passenger seat-side mirror 52 tilts leftward even though the operation knob 11 is actuated obliquely in the upper right direction.

(3) Case Where Operation Knob is Actuated in all Directions Concurrently

Figure 24:
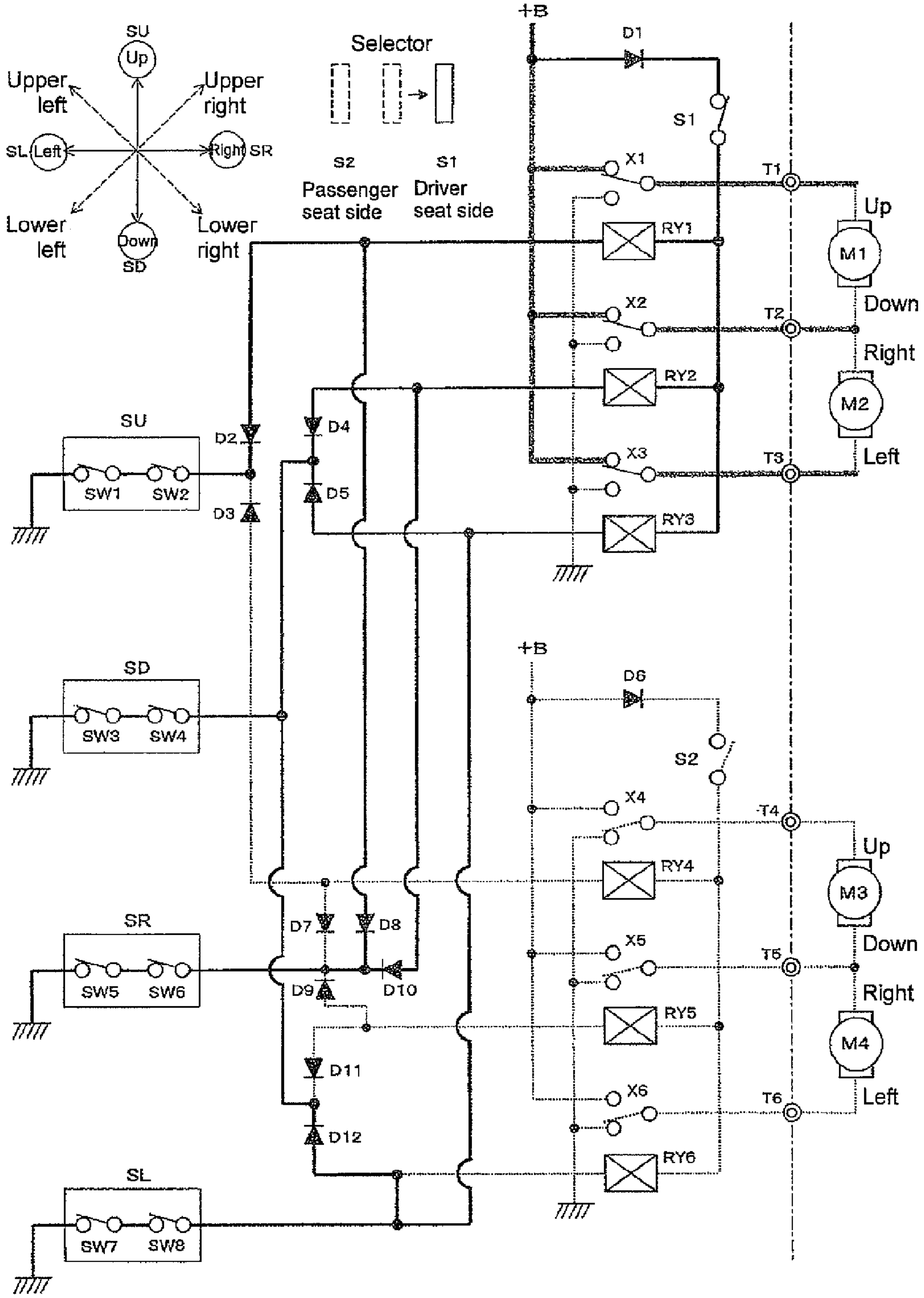
FIG. 24 is a circuit diagram showing actions for controlling the driver seat-side mirror in a case where the operation knob is actuated in all directions concurrently.

With reference to FIG. 24, first, description will be given of actions at the time when the operation knob 11 is actuated in all the directions concurrently in a case where the selector knob 12 is switched to the driver seat side (the right side).

Herein, since the selector knob 12 is switched to the driver seat side, the selector S1 is turned on and the selector S2 is turned off. Moreover, when the operation knob 11 is actuated in all the directions concurrently, the switch contacts SW1 and SW2 of the up-direction switch SU, the switch contacts SW3 and SW4 of the down-direction switch SD, the switch contacts SW5 and SW6 of the right-direction switch SR and the switch contacts SW7 and SW8 of the left-direction switch SL are closed, so that all the up-direction switch SU, the down-direction switch SD, the right-direction switch SR and the left-direction switch SL are turned on. As shown by a black, bold and solid line in FIG. 24, thus, a control current path is formed from the power supply +B to the respective switches SU, SD, SR and SL through the diode D1, the selector S1 and the relays RY1 to RY3, so that a control current flows into each of the relays RY1 to RY3. Then, each of the relays RY1 to RY3 is activated, and each of the contacts X1 to X3 is switched to the power supply side. As a result, voltages are applied from the power supply +B to the two ends of the motor M1 through the contacts X1 and X2. However, these voltages are equal in potential to each other; therefore, no electric current flows into the motor M1. Moreover, voltages are applied from the power supply +B to the two ends of the motor M2 through the contacts X2 and X3. However, these voltages are also equal in potential to each other; therefore, no electric current flows into the motor M2. For these reasons, since each of the motors M1 and M2 does not rotate, the driver seat-side mirror 51 (see FIG. 6) does not tilt.

FIG. 30 shows a table of the actions for controlling the driver seat-side mirror 51 in the case where the operation knob 11 is actuated in all the directions concurrently. As shown in FIG. 30, when the operation knob 11 is actuated in all the directions concurrently, that is, when the operation knob 11 is actuated in the four directions concurrently, all the relays RY1 to RY3 are turned on, so that each of the motors M1 and M2 stops without rotating. Therefore, the driver seat-side mirror 51 does not tilt in any directions.

Figure 25:
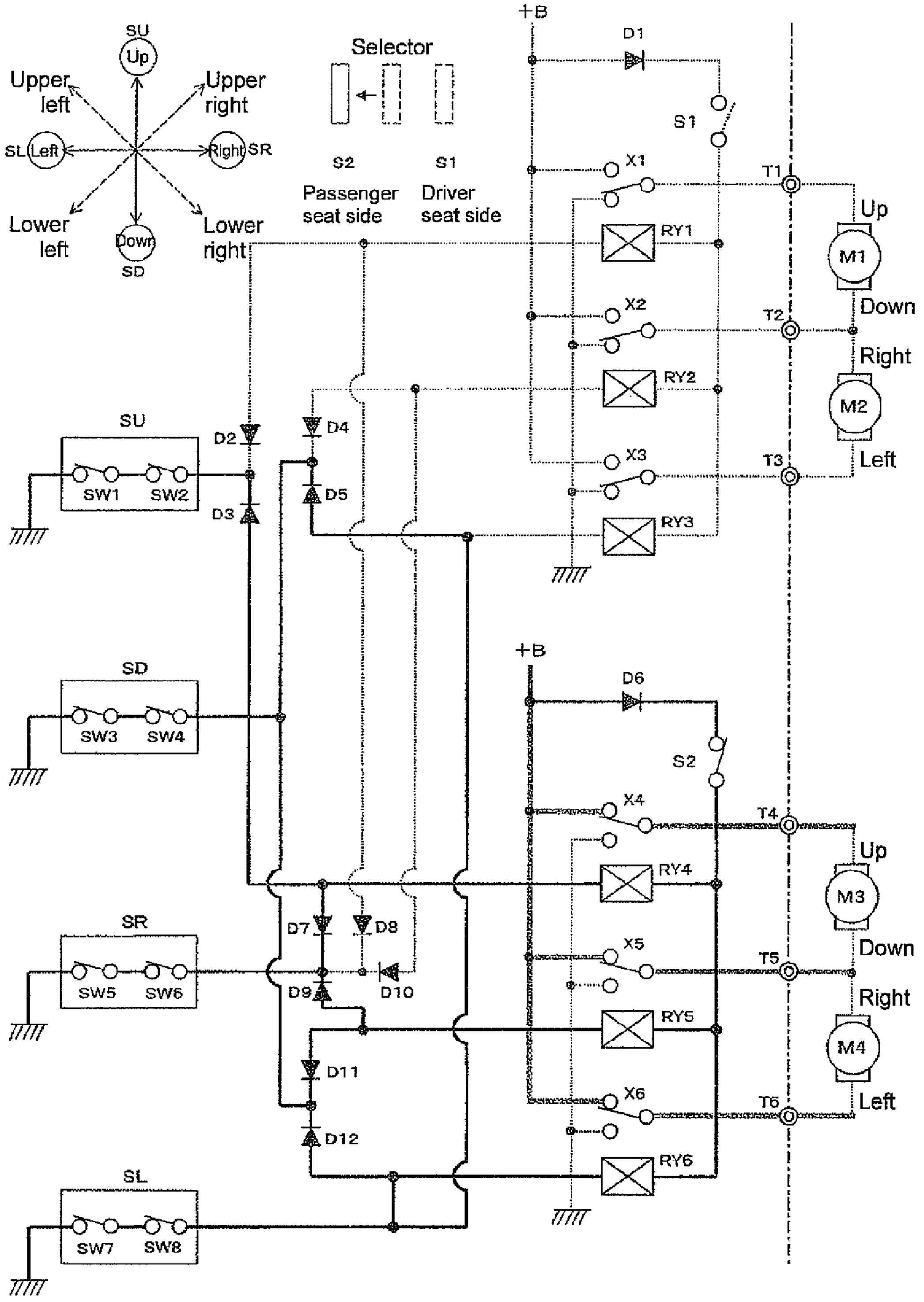
FIG. 25 is a circuit diagram showing actions for controlling the passenger seat-side mirror in the case where the operation knob is actuated in all the directions concurrently.

With reference to FIG. 25, next, description will be given of actions at the time when the operation knob 11 is actuated in all the directions concurrently in a case where the selector knob 12 is switched to the passenger seat side (the left side).

Herein, since the selector knob 12 is switched to the passenger seat side, the selector S2 is turned on and the selector S1 is turned off. Moreover, when the operation knob 11 is actuated in all the directions concurrently, the switch contacts SW1 and SW2 of the up-direction switch SU, the switch contacts SW3 and SW4 of the down-direction switch SD, the switch contacts SW5 and SW6 of the right-direction switch SR and the switch contacts SW7 and SW8 of the left-direction switch SL are closed, so that all the up-direction switch SU, the down-direction switch SD, the right-direction switch SR and the left-direction switch SL are turned on. As shown by a black, bold and solid line in FIG. 25, thus, a control current path is formed from the power supply +B to the respective switches SU, SD, SR and SL through the diode D6, the selector S2 and the relays RY4 to RY6, so that a control current flows into each of the relays RY4 to RY6. Then, each of the relays RY4 to RY6 is activated, and each of the contacts X4 to X6 is switched to the power supply side. As a result, voltages are applied from the power supply +B to the two ends of the motor M3 through the contacts X4 and X5. However, these voltages are equal in potential to each other; therefore, no electric current flows into the motor M3. Moreover, voltages are applied from the power supply +B to the two ends of the motor M4 through the contacts X5 and X6. However, these voltages are also equal in potential to each other; therefore, no electric current flows into the motor M4. For these reasons, since each of the motors M3 and M4 does not rotate, the passenger seat-side mirror 52 (see FIG. 6) does not tilt.

FIG. 31 shows a table of the actions for controlling the passenger seat-side mirror 52 in the case where the operation knob 11 is actuated in all the directions concurrently. As shown in FIG. 31, when the operation knob 11 is actuated in all the directions concurrently, that is, when the operation knob 11 is actuated in the four directions concurrently, all the relays RY4 to RY6 are turned on, so that each of the motors M3 and M4 stops without rotating. Therefore, the passenger seat-side mirror 52 does not tilt in any directions.

As described above, according to this embodiment, predetermined switches among the direction selector switches SU, SD, SR and SL as well as predetermined relays among the relays RY1 to RY6 are turned on in accordance with a direction in which the operation knob 11 is actuated, and a drive current to be supplied to each of the motors M1 to M4 is controlled in accordance with the ON/OFF statuses of the respective relays. In any cases including the case where the operation knob 11 is actuated normally, the case where the operation knob 11 is actuated obliquely, and the case where the operation knob 11 is actuated in all the directions concurrently, the motors can be controlled in accordance with the respective actuated directions. According to this embodiment, moreover, the motor control device obtained as described above can deal with the case where the operation knob 11 is actuated obliquely and the case where the operation knob 11 is actuated in all the directions concurrently by means of the electric circuit without depending on the structure of the switch, which prevents increase in size of the switch and requires no expensive components such as a microcomputer. Therefore, the motor control device can be realized at low cost.

In the case where the operation knob 11 is actuated normally, moreover, a drive current flows into each of the motors M1 to M4 in accordance with an actuated direction. Therefore, each of the motors M1 to M4 can be rotated in an intended direction, so that each of the mirrors 51 and 52 can be tilted in an intended direction. Even in the case where the operation knob 11 is actuated obliquely, a drive current is supplied to each of the motors M1 to M4 in a predetermined direction or the supply of the drive current is stopped. Therefore, the motor control device obtained as described above allows prevention of occurrence of a dead short due to a factor that some of the plurality of direction selector switches SU, SD, SR and SL are turned on, and allows avoidance of smoking and igniting. Even in the case where the operation knob 11 is actuated in all the directions concurrently, further, supply of a drive current to each of the motors M1 to M4 is stopped. Therefore, the motor control device obtained as described above allows prevention of occurrence of a dead short due to a factor that all the plurality of direction selector switches SU, SD, SR and SL are turned on, and allows avoidance of smoking and igniting.

According to foregoing embodiment, moreover, the selector knob 12 is switched to control the tilting direction of the driver seat-side mirror 51 and the tilting direction of the passenger seat-side mirror 52 independently of each other. Further, in the case where the operation knob 11 is actuated normally, each of the mirrors 51 and 52 can tilt in an intended direction. On the other hand, in the case where the actuation knob 11 is actuated obliquely or is actuated in all the directions concurrently, each of the mirrors 51 and 52 can tilt in a predetermined direction or the tilt of each mirror can be stopped.

According to the foregoing embodiment, use of the relays RY1 to RY6 as an open/close element brings about the following advantages. For example, each of the mirror control circuits 31 and 32 (see FIG. 6) can be configured with a simple circuit using the relays. Further, use of such an inexpensive relay allows suppression of increase of cost as the entire device.

The present invention may adopt various embodiments in addition to the foregoing embodiment. In the foregoing embodiment, as an example, the relay is used as an open/close element. In place of the relay, the open/close element may be a semiconductor switching element that allows conduction of a large amount of electric current. In the foregoing embodiment, moreover, as an example, the contact part 13 of the mirror switch 1 is a rubber contact. In place of such a rubber contact, the contact part 13 may be a normal contact.

In the foregoing embodiment, as an example, one or more embodiments of the present invention is applied to the mirror adjustment device. However, the present invention is not limited to the adjustment of the mirror. For example, one or more embodiments of the present invention may be applied to adjustment of an angle of a screen in a display device, and the like.

What is claimed is:

1. A motor control device operable to rotate a motor based on an actuated direction of an operation knob of an operation switch in a direction corresponding to the actuated direction, the motor control device comprising:

a plurality of direction selector switches provided so as to correspond to respective actuated directions of the operation knob; and a plurality of open/close elements provided between the plurality of direction selector switches and a power supply, wherein each of the open/close elements is turned on when a control current is supplied thereto, wherein when the operation knob is actuated, the direction selector switch corresponding to the actuated direction is turned on, a control current is supplied from the power supply to a predetermined one of the open/close elements connected to the relevant switch, and the predetermined open/close element is turned on, wherein a drive current that flows from the power supply into the motor through a current carrying path of the open/close element is controlled according to a ON/OFF status of each of the open/close elements, and wherein when the operation knob is actuated in a plurality of directions, if not all of the directions are actuated, the direction selector switches corresponding to the respective actuated directions are turned on, and a drive current is supplied to the motor in a predetermined direction, or the supply of the drive current is stopped.

2. The motor control device according to claim 1, wherein the open/close element serves as a relay, when the relay is turned off, a contact of the relay is switched to a ground side to disconnect the motor from the power supply, and when the relay is turned on, the contact of the relay is switched to a power supply side to connect the motor to the power supply.

3. A motor control device operable to rotate a motor based on an actuated direction of an operation knob of an operation switch in a direction corresponding to the actuated direction, the motor control device comprising:

a plurality of direction selector switches provided so as to correspond to respective actuated directions of the operation knob; and a plurality of open/close elements provided between the plurality of direction selector switches and a power supply, wherein each of the open/close elements is turned on when a control current is supplied thereto, wherein when the operation knob is actuated, the direction selector switch corresponding to the actuated direction is turned on, a control current is supplied from the power supply to a predetermined one of the open/close elements connected to the relevant switch, and the predetermined open/close element is turned on, wherein a drive current that flows from the power supply into the motor through a current carrying path of the open/close element is controlled according to a ON/OFF status of each of the open/close elements, and wherein when the operation knob is actuated in all directions, all of the direction selector switches are turned on, and the supply of a drive current to the motor is stopped.

4. The motor control device according to claim 3, wherein the open/close element serves as a relay, when the relay is turned off, a contact of the relay is switched to a ground side to disconnect the motor from the power supply, and when the relay is turned on, the contact of the relay is switched to a power supply side to connect the motor to the power supply.

5. A motor control device operable to rotate a motor based on an actuated direction of an operation knob of an operation switch in a direction corresponding to the actuated direction, the motor control device comprising:

a plurality of direction selector switches provided so as to correspond to respective actuated directions of the operation knob; and a plurality of open/close elements provided between the plurality of direction selector switches and a power supply, wherein each of the open/close elements is turned on when a control current is supplied thereto, wherein when the operation knob is actuated, the direction selector switch corresponding to the actuated direction is turned on, a control current is supplied from the power supply to a predetermined one of the open/close elements connected to the relevant switch, and the predetermined open/close element is turned on, wherein a drive current that flows from the power supply into the motor through a current carrying path of the open/close element is controlled according to a ON/OFF status of each of the open/close elements, and wherein the operation switch serves as a mirror switch for adjusting an orientation of a mirror provided on a vehicle, the operation knob is actuated in four directions in order to allow the mirror to tilt in one of an up direction, a down direction, a right direction and a left direction, when the operation knob is actuated in exactly one of the four directions, one direction selector switch corresponding to the actuated direction is turned on, and a drive current corresponding to the actuated direction is supplied to the motor, when the operation knob is actuated in exactly two of the the four directions, two direction selector switches corresponding to the actuated directions are turned on, and a drive current is supplied to the motor in a predetermined direction, or the supply of the drive current is stopped, and when the operation knob is actuated in all of the four directions, four direction selector switches are turned on, and the supply of a drive current to the motor is stopped.

6. The motor control device according to claim 5, wherein the mirror switch includes a selector knob for selecting a control target from a driver seat-side mirror provided on a driver seat side of a vehicle and a passenger seat-side mirror provided on a passenger seat side of the vehicle, a first switch contact, which is turned on when the driver seat-side mirror is selected by the selector knob, is inserted between each open/close element for controlling the driver seat-side mirror and the power supply, and a second switch contact, which is turned on when the passenger seat-side mirror is selected by the selector knob, is inserted between each open/close element for controlling the passenger seat-side mirror and the power supply.

7. The motor control device according to claim 6, wherein the open/close element serves as a relay, when the relay is turned off, a contact of the relay is switched to a ground side to disconnect the motor from the power supply, and when the relay is turned on, the contact of the relay is switched to a power supply side to connect the motor to the power supply.

8. The motor control device according to claim 5, wherein the open/close element serves as a relay, when the relay is turned off, a contact of the relay is switched to a ground side to disconnect the motor from the power supply, and when the relay is turned on, the contact of the relay is switched to a power supply side to connect the motor to the power supply.

9. A motor control device operable to rotate a motor based on an actuated direction of an operation knob of an operation switch in a direction corresponding to the actuated direction, the motor control device comprising:

a plurality of direction selector switches provided so as to correspond to respective actuated directions of the operation knob; and a plurality of open/close elements provided between the plurality of direction selector switches and a power supply, wherein each of the open/close elements is turned on when a control current is supplied thereto, wherein when the operation knob is actuated, the direction selector switch corresponding to the actuated direction is turned on, a control current is supplied from the power supply to a predetermined one of the open/close elements connected to the relevant switch, and the predetermined open/close element is turned on, wherein a drive current that flows from the power supply into the motor through a current carrying path of the open/close element is controlled according to a ON/OFF status of each of the open/close elements, and wherein the open/close element serves as a relay, when the relay is turned off, a contact of the relay is switched to a ground side to disconnect the motor from the power supply, and when the relay is turned on, the contact of the relay is switched to a power supply side to connect the motor to the power supply.

10. A motor control device operable to rotate a motor based on an actuated direction of an operation knob of an operation switch in a direction corresponding to the actuated direction, the motor control device comprising:

a plurality of direction selector switches provided so as to correspond to respective actuated directions of the operation knob; and a plurality of open/close elements provided between the plurality of direction selector switches and a power supply, wherein each of the open/close elements is turned on when a control current is supplied thereto, wherein when the operation knob is actuated, the direction selector switch corresponding to the actuated direction is turned on, a control current is supplied from the power supply to a predetermined one of the open/close elements connected to the relevant switch, and the predetermined open/close element is turned on, wherein a drive current that flows from the power supply into the motor through a current carrying path of the open/close element is controlled according to a ON/OFF status of each of the open/close elements, wherein when the operation knob is actuated in an optional direction, the direction selector switch corresponding to the actuated direction is turned on, and a drive current corresponding to the actuated direction is supplied to the motor, and wherein the open/close element serves as a relay, when the relay is turned off, a contact of the relay is switched to a ground side to disconnect the motor from the power supply, and when the relay is turned on, the contact of the relay is switched to a power supply side to connect the motor to the power supply.

* * * * *